(12) United States Patent
Kim et al.

(10) Patent No.: US 9,025,542 B2
(45) Date of Patent: May 5, 2015

(54) ACK/NACK TRANSMISSION METHOD AND APPARATUS THEREFOR

(75) Inventors: Hak Seong Kim, Anyang-si (KR); Han Byul Seo, Anyang-si (KR); Ki Jun Kim, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 13/511,132

(22) PCT Filed: Nov. 23, 2010

(86) PCT No.: PCT/KR2010/008289
§ 371 (c)(1),
(2), (4) Date: May 21, 2012

(87) PCT Pub. No.: WO2011/062459
PCT Pub. Date: May 26, 2011

(65) Prior Publication Data
US 2012/0307755 A1    Dec. 6, 2012

Related U.S. Application Data

(60) Provisional application No. 61/263,791, filed on Nov. 23, 2009, provisional application No. 61/264,666, filed on Nov. 26, 2009.

(51) Int. Cl.
*H04W 72/04* (2009.01)
*H04L 1/18* (2006.01)
*H04L 1/00* (2006.01)
(Continued)

(52) U.S. Cl.
CPC ............ *H04L 1/1858* (2013.01); *H04L 1/1854* (2013.01); *H04W 24/00* (2013.01); *H04W 28/04* (2013.01); *H04W 28/06* (2013.01);
(Continued)

(58) Field of Classification Search
None
See application file for complete search history.

(56) References Cited

U.S. PATENT DOCUMENTS

2005/0143114 A1* 6/2005 Moulsley et al. ............. 455/522
2006/0176862 A1  8/2006 Ishimori et al.
(Continued)

FOREIGN PATENT DOCUMENTS

CN          101536584        9/2009
EP          1796303 A2 *     6/2007    ............... H04L 1/00
(Continued)

OTHER PUBLICATIONS

KDDI, Hybrid FDM/CDM Based Multiplexing for ACK/NACK Signals in E-UTRA Downlink, R1-073784, Aug. 20-24, 2007.*
(Continued)

*Primary Examiner* — Hassan Kizou
*Assistant Examiner* — Tejis Daya
(74) *Attorney, Agent, or Firm* — Lee, Hong, Degerman, Kang & Waimey

(57) ABSTRACT

The present invention relates to a wireless communication system. More specifically, the present invention relates to a method and an apparatus for transmitting ACK and NACK with a terminal set in a state of ACK/NACK repetition mode, and the method comprises the steps of: receiving first data through a first subframe; receiving second data through a second subframe; and transmitting an ACK/NACK signal for the second data, wherein the repetition frequency of the ACK/NACK signal for the second data is reduced if a difference between the first subframe and the second subframe is smaller than a reference value.

4 Claims, 26 Drawing Sheets

(51) Int. Cl.
   *H04W 24/00*   (2009.01)
   *H04W 28/04*   (2009.01)
   *H04W 28/06*   (2009.01)

(52) U.S. Cl.
   CPC ............. *H04L 1/0015* (2013.01); *H04L 1/003* (2013.01); *H04L 1/1825* (2013.01)

(56) References Cited

U.S. PATENT DOCUMENTS

| | | | |
|---|---|---|---|
| 2008/0046793 A1 | 2/2008 | Heo et al. | |
| 2008/0095109 A1* | 4/2008 | Malladi et al. | 370/330 |
| 2008/0310389 A1* | 12/2008 | Suzuki et al. | 370/346 |
| 2009/0055703 A1* | 2/2009 | Kim et al. | 714/748 |
| 2009/0207771 A1 | 8/2009 | Lindskog et al. | |
| 2009/0207793 A1* | 8/2009 | Shen et al. | 370/329 |
| 2009/0279458 A1* | 11/2009 | Shen et al. | 370/280 |
| 2011/0255484 A1* | 10/2011 | Zhang et al. | 370/329 |

FOREIGN PATENT DOCUMENTS

| | | |
|---|---|---|
| JP | 08-154096 | 6/1996 |
| JP | 2005-522911 | 7/2005 |
| JP | 2010503291 | 1/2010 |
| JP | 2010530192 | 9/2010 |
| JP | 2010537546 | 12/2010 |
| JP | 2011517383 | 6/2011 |
| JP | 2011520394 | 7/2011 |
| KR | 10-2005-0098131 | 10/2005 |

OTHER PUBLICATIONS

Panasonic, ACK/NACK repetition and Implicit Resource Allocation for PUCCH, R1-081200, Mar. 31- Apr. 4, 2008.*
Panasonic, Way Forward on the Uplink ACK/NACK repetition for PUCCH, R1-082402, Jun. 30-Jul. 4, 2008.*
Qualcomm, ACK Repetition for E-UTRA Uplink; R1-082549, Jun. 30-Jul. 4, 2008.*
Motorola, Uplink ACK/NACK Repetition, R1-082474, Jun. 29-Jul. 4, 2008.*
KDDI, "Hybrid FDM/CDM Based Multiplexing for ACK/NACK Signals in E-UTRA Downlink," 3GPP TSG RAN WG1 Meeting #51, R1-074756, Nov. 2007, 4 pages.
Panasonic, "Ack/Nack repetition and Implicit Resource Allocation for PUCCH," 3GPP TSG RAN WG1 Meeting #52bis R1-081200, Mar. 2008, 2 pages.
Texas Instruments, "RRC Configured ACK/NAK Repetition in EUTRA Uplink," 3GPP TSG RAN WG1 #53b, R1-082488, Jun. 2008, 2 pages.

* cited by examiner

ACK/NACK TRANSMISSION METHOD AND APPARATUS THEREFOR

CROSS-REFERENCE TO RELATED APPLICATIONS

This application is the National Stage filing under 35 U.S.C. 371 of International Application No. PCT/KR2010/008289, filed on Nov. 23, 2010, which claims the benefit of U.S. Provisional Application Ser. No. 61/263,791, filed on Nov. 23, 2009, and U.S. Provisional Application Ser. No. 61/264,666, filed on Nov. 26, 2009, the contents of which are all hereby incorporated by reference herein in their entirety.

TECHNICAL FIELD

The present invention relates to a wireless communication system, and more particularly, to a method and apparatus for transmitting ACK/NACK.

BACKGROUND ART

Wireless communication systems have been diversified in order to provide various types of communication services such as voice or data service. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system and the like.

DISCLOSURE

Technical Problem

An object of the present invention is to provide a method and apparatus for transmitting ACK/NACK and, more particularly, a method and apparatus for efficiently performing ACK/NACK repeated transmission.

The technical problems solved by the present invention are not limited to the above technical problems and those skilled in the art may understand other technical problems from the following description.

Technical Solution

The object of the present invention can be achieved by providing a method of transmitting acknowledgement (ACK)/negative ACK (NACK) at a user equipment in a state of an ACK/NACK repetition mode in a wireless communication system, the method including receiving first data through a first subframe, receiving second data through a second subframe, and transmitting an ACK/NACK signal for the second data, wherein, if a difference between the first subframe and the second subframe is less than a criterion, the number of times of repetition of the ACK/NACK signal for the second data is reduced.

According to another aspect of the present invention, there is provided a wireless communication user equipment configured to transmit acknowledgement (ACK)/negative ACK (NACK) in a state of setting an ACK/NACK repetition mode, the wireless communication user equipment including a radio frequency (RF) unit; and a processor configured to receive first data through a first subframe, receive second data through a second subframe, and transmit an ACK/NACK signal for the second data, wherein, if a difference between the first subframe and the second subframe is less than a criterion, the number of times of repetition of the ACK/NACK signal for the second data is reduced.

If an ACK/NACK signal for the first data and the ACK/NACK signal for the second data are scheduled to be transmitted through the same subframe, transmission of the ACK/NACK signal for the first data may be dropped.

If an ACK/NACK signal for the first data and the ACK/NACK signal for the second data are scheduled to be transmitted through the same subframe, the ACK/NACK signal for the first data and the ACK/NACK signal for the second data may b transmitted through ACK/NACK bundling.

If an ACK/NACK signal for the first data and the ACK/NACK signal for the second data are scheduled to be transmitted through the same subframe, the ACK/NACK signal for the first data and the ACK/NACK signal for the second data may be transmitted through ACK/NACK multiplexing Reduction in number of times of repetition may be temporarily applied to transmission of the ACK/NACK signal for the second data.

If the difference between the first subframe and the second subframe is less than the criterion, the ACK/NACK repetition mode may be released.

Advantageous Effects

According to the embodiments of the present invention, it is possible to efficiently transmit ACK/NACK and, more particularly, to efficiently perform ACK/NACK repeated transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, or a Multi Carrier Frequency Division Multiple Access (MC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A $3^{rd}$ Generation Partnership Project Long Term Evolution (3GPP LTE) communication system is part of the E-UMTS (Evolved UMTS) which employs the E-UTRA. The LTE-Advanced (LTE-A) is an evolved version of the 3GPP LTE.

Although the following embodiments focus on the 3GPP LTE/LTE-A system for clarity of description, the technical features of the present invention are not limited thereto.

Figure 1:
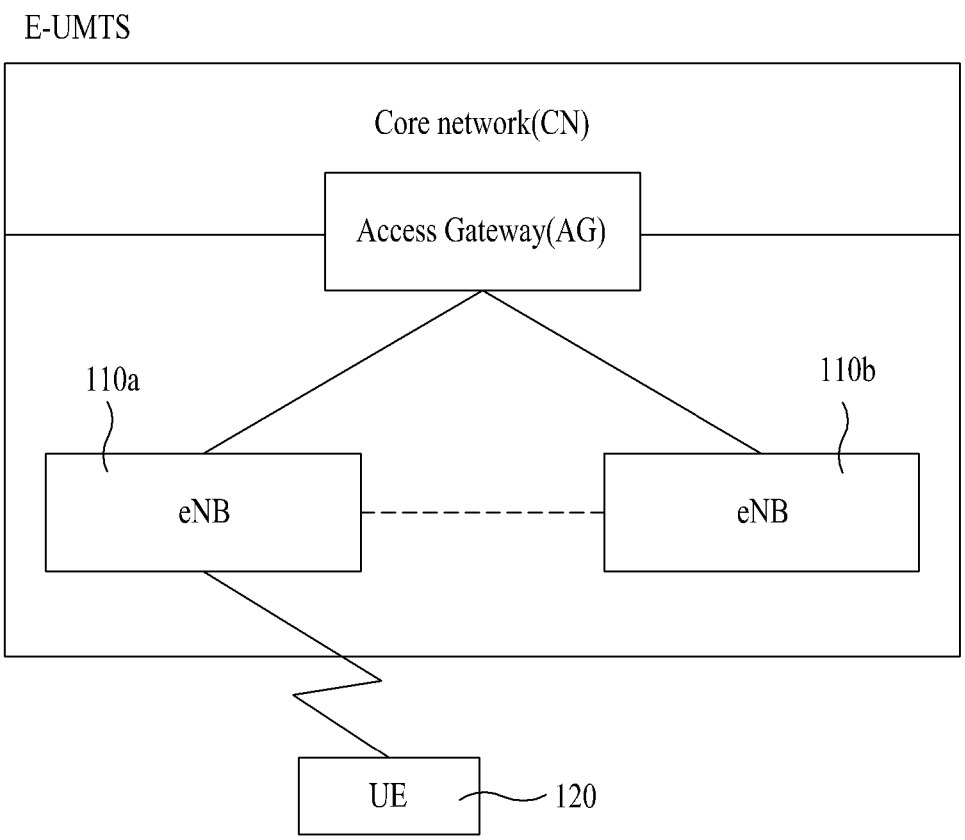
FIG. 1 is a diagram showing a network structure of an Evolved Universal Mobile Telecommunications System (E-UMTS)

FIG. 1 is a diagram showing a network architecture of an E-UMTS. The E-UMTS system is an evolved form of the WCDMA UMTS system and has been standardized in the $3^{rd}$ Generation Partnership Project (3GPP). The E-UMTS system is also called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110*a* and 110*b*, and an Access Gateway (AG) which is located at an end of a network (E-UTRAN) and which is connected to an external network. Generally, an eNB can simultaneously transmit multiple data streams for a broadcast service, a multicast service and/or a unicast service. One or more cells (e.g., three) may exist per eNB. The cell is set to use a bandwidth such as 1.4, 3, 5, 10, 15 and 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data will be transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG, a network node for user registration of the UE, etc. The AG manages mobility of a UE on a Tracking Area (TA) basis. One TA includes a plurality of cells.

Figure 2:
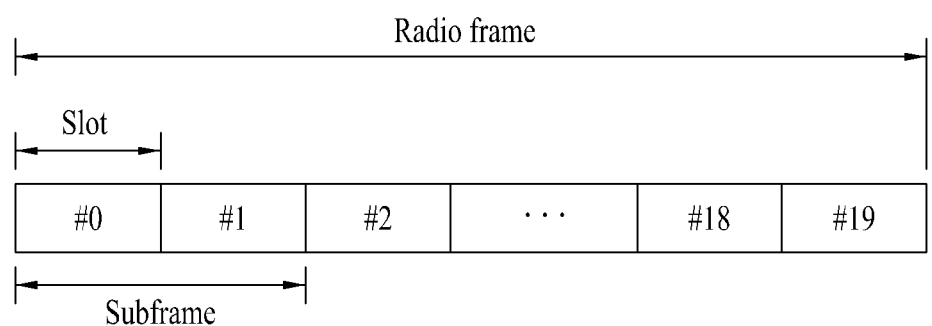
FIG. 2 is a diagram showing the structure of a radio frame used in an E-UMTS system.

FIG. 2 is a diagram showing the structure of a radio frame of an E-UMTS system.

Referring to FIG. 2, the E-UMTS system uses a radio frame having a length of 10 ms and one radio frame includes 10 subframes. The subframe includes two contiguous slots. The slot has a length of 0.5 ms and includes a plurality of symbols (e.g., OFDM symbols or SC-FDMA symbols).

Figure 3:
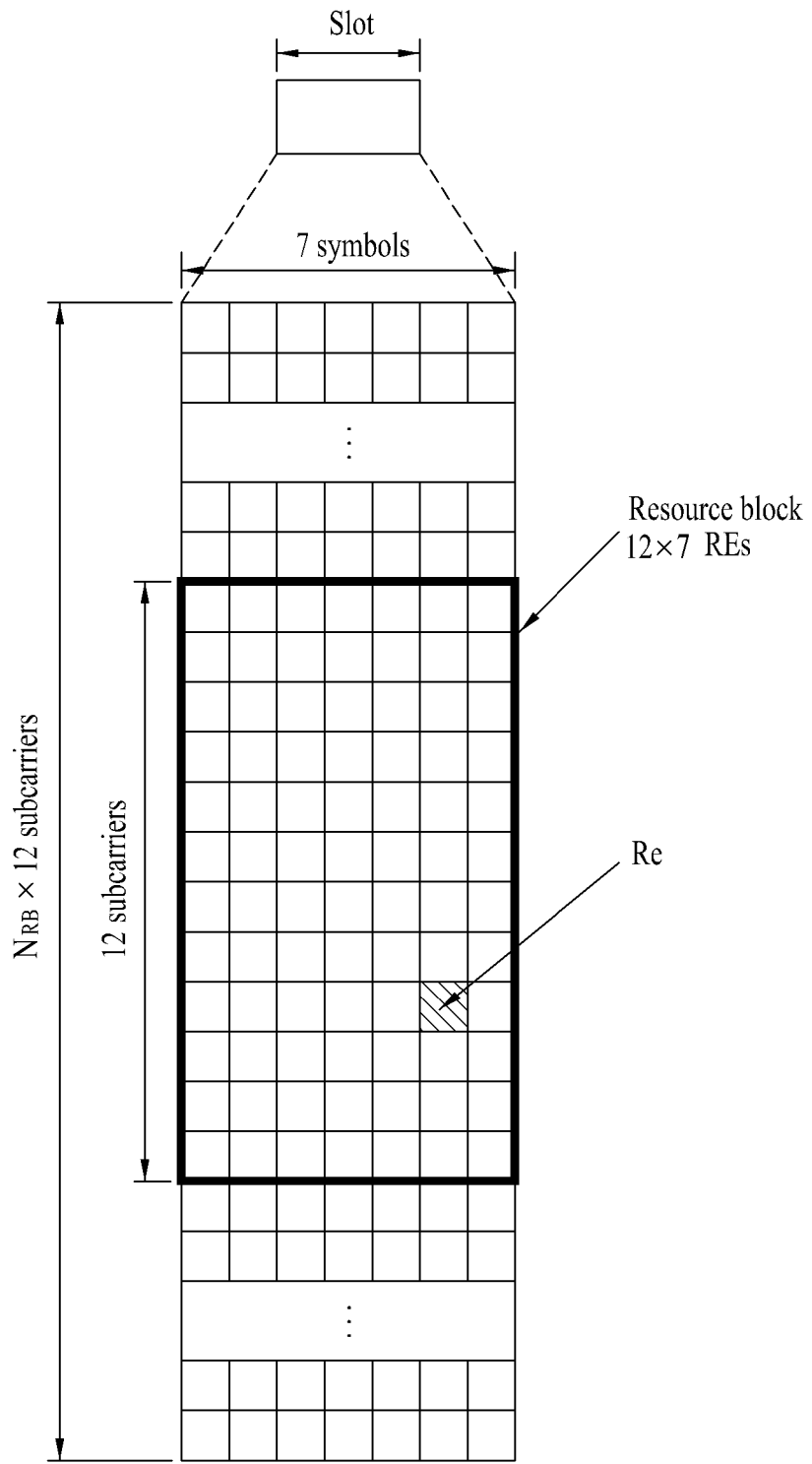
FIG. 3 is a diagram showing a resource grid of a radio frame.

FIG. 3 is a diagram showing a resource grid of a slot.

Referring to FIG. 3, a slot includes a plurality of OFDM symbols or SC-FDMA symbols and includes a plurality of resource blocks (RBs) in a frequency domain. One RB includes 12×7(6) resource elements (REs). The number of RBs included in a time slot depends on a frequency bandwidth set in a cell. Each block of the resource grid indicates minimum resource defined by one symbol and one subcarrier and is referred to as a resource element (RE). Although FIG. 3 shows the case in which a time slot includes seven symbols and an RB includes 12 subcarriers, the present invention is not limited thereto. For example, the number of symbols included in the slot may be changed according to the length of a cyclic prefix (CP).

Figure 4:
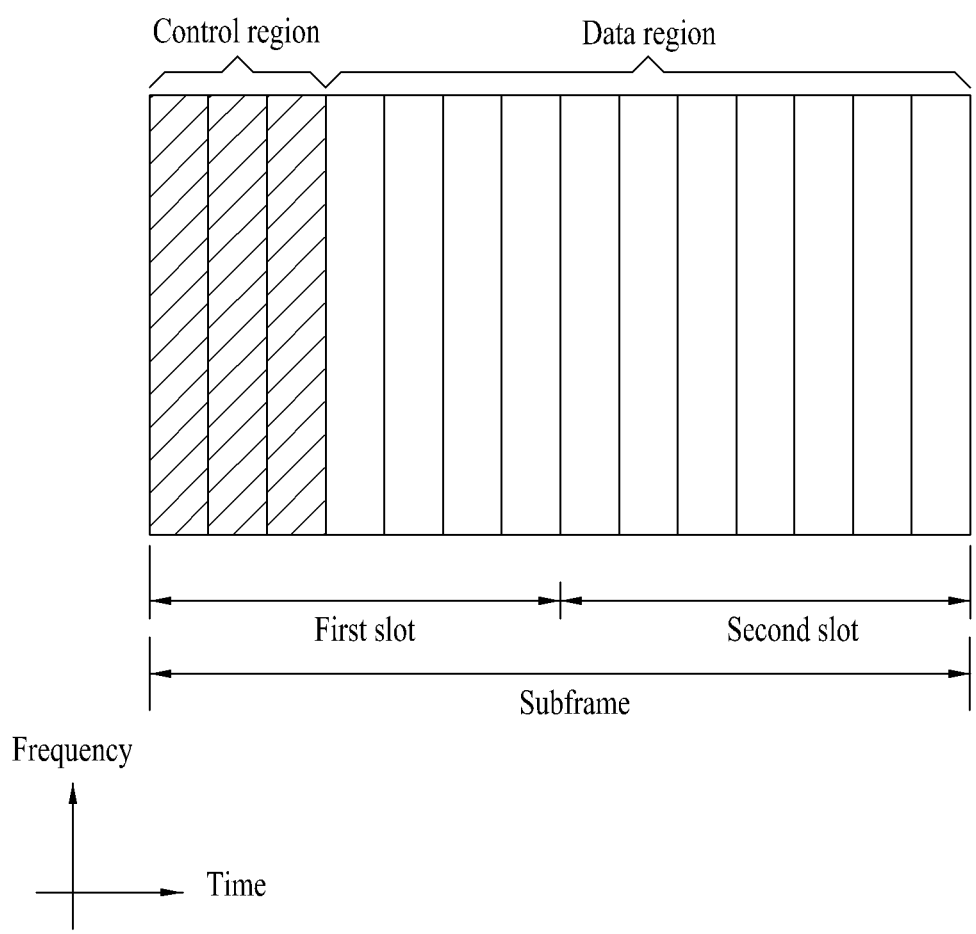
FIG. 4 is a diagram showing the structure of a downlink subframe.

FIG. 4 is a diagram showing the structure of a downlink subframe.

Referring to FIG. 4, in a downlink subframe of an LTE system, an L1/L2 control region and a data region are multiplexed using a Time Division Multiplexing (TDM) method. The L1/L2 control region includes n (e.g., 3 or 4) first OFDM symbols of the subframe and the remaining OFDM symbols are used as the data region. The L1/L2 control region includes a Physical Downlink Control Channel (PDCCH) for carrying downlink control information and the data region includes a Physical Downlink Shared Channel (PDSCH) which is a downlink data channel. In order to receive a downlink signal, a User Equipment (UE) reads downlink scheduling information from the PDCCH and receives downlink data on the PDSCH using resource assignment information indicated by the downlink scheduling information. Resources (that is, PDSCH) scheduled to the UE are assigned in units of resource blocks or resource block groups.

The PDCCH informs the UE of information associated with resource assignment of a Paging Channel (PCH) and a Downlink-Shared Channel (DL-SCH), both of which are transfer channels, uplink scheduling grant, HARQ information and the like. Information transmitted through the PDCCH is collectively called Downlink Control Information (DCI). The PDCCH has a format which varies according to information. There are various DCI formats according to control information.

Table 1 shows a DCI format 0 for uplink scheduling.

TABLE 1

| Field | Bits | Comment |
| --- | --- | --- |
| Format | 1 | Uplink grant or downlink assignment |
| Hopping flag | 1 | Frequency hopping on/off |
| RB assignment | 7 | Resource block assigned for PUSCH |
| MCS | 5 | Modulation scheme, coding scheme, etc. |

TABLE 1-continued

| Field | Bits | Comment |
|---|---|---|
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

\* MCS: Modulation and Coding Scheme
\* TPC: Transmit Power Control
\* RNTI: Radio Network Temporary Identifier
\* CRC: Cyclic Redundancy Check A UE to which the PDCCH is transmitted is identified using the RNTI. For example, it is assumed that a PDCCH is CRC-masked with an RNTI "A" and uplink radio resource assignment information "B" (e.g., frequency position) and transmission format information "C" (e.g., a transmission block size, modulation scheme, coding information or the like) are transmitted. In this case, UEs located in a cell monitor the PDCCH using RNTI information thereof and a specific UE with RNTI "A" performs uplink transmission according to information about B and C obtained from the PDCCH.

Figure 5:
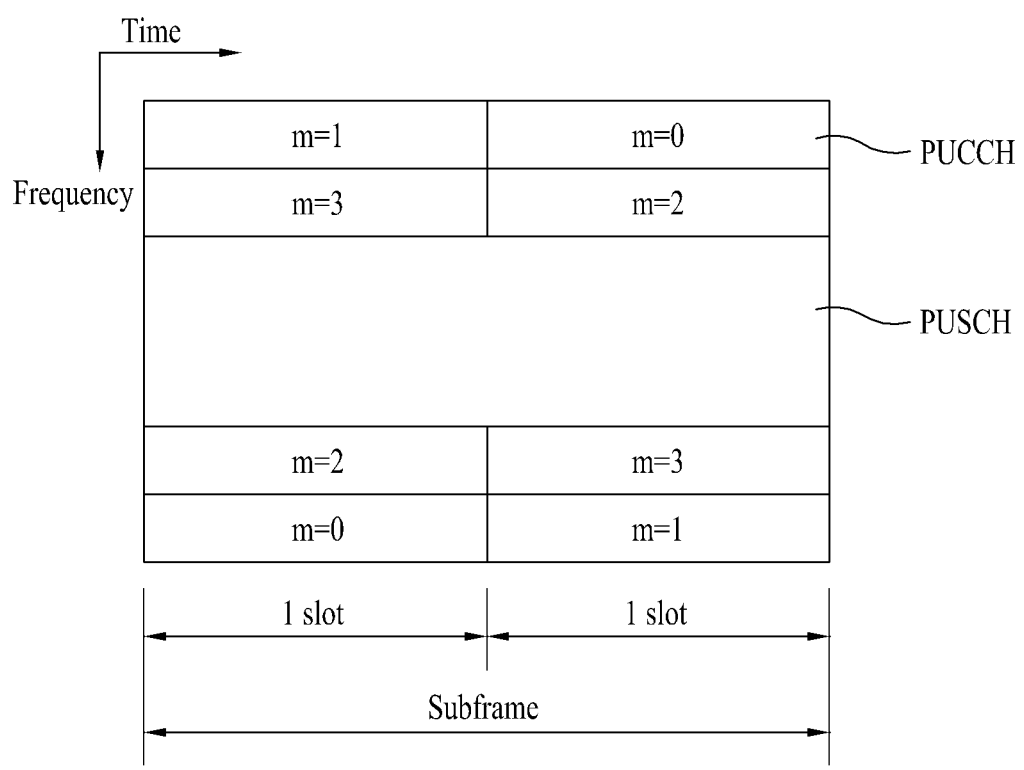
FIG. 5 is a diagram showing the structure of an uplink subframe.

FIG. 5 is a diagram showing the structure of an uplink subframe used in the LTE system.

Referring to FIG. 5, the uplink subframe includes a plurality of slots (e.g., 2). Each slot may include different numbers of SC-FDMA symbols according to the length of the CP. The uplink subframe is divided into a data region and a control region in a frequency domain. The data region includes a PUSCH and is used to transmit a data signal such as voice. The control region includes a PUCCH and is used to transmit uplink control information. The PUCCH includes RB pairs located at both ends of the data region on a frequency axis and hops between slots. The uplink control information includes a Scheduling Request (SR) for requesting uplink transfer resources, HARQ Acknowledgement (ACK)/Negative ACK (NACK) for downlink data, downlink channel (state) information and the like. The downlink channel (state) information includes a Precoding Matrix Indicator (PMI), a Rank Indicator (RI) and a Channel Quality Indicator (CQI).

Figure 6:
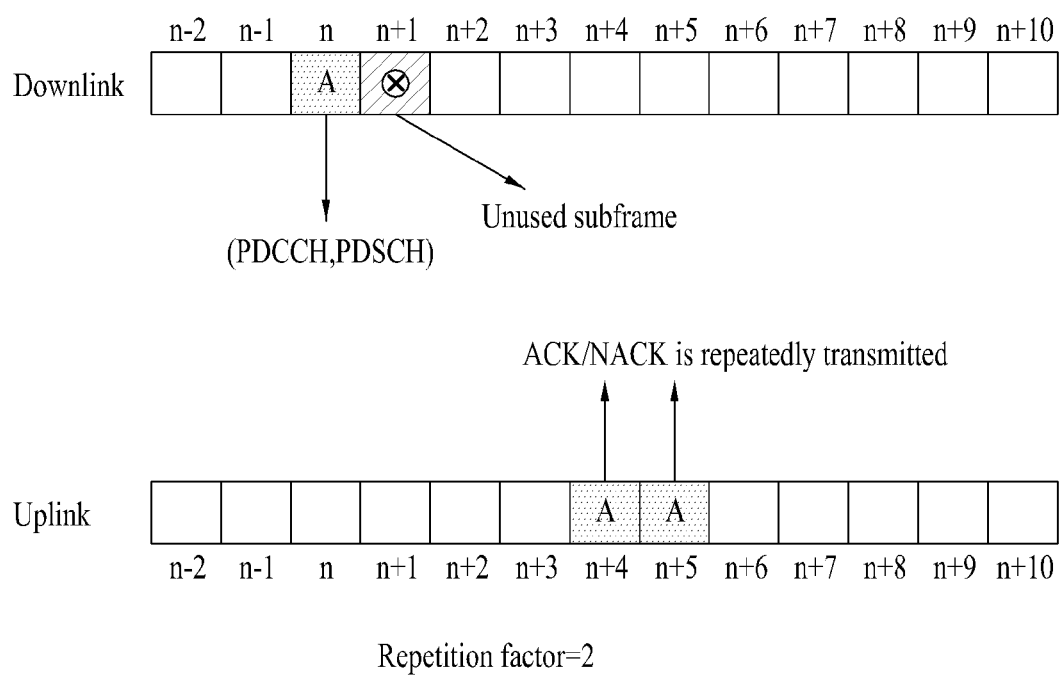
FIG. 6 is a diagram showing an example of repeatedly transmitting ACK/NACK according to the related art.

FIG. 6 is a diagram showing an example of repeatedly transmitting ACK/NACK according to the related art.

ACK/NACK repetition is enabled or disabled by ackNack-Repetition which is a UE-specific parameter set by a higher layer. If ACK/NACK repetition is enabled, a UE repeats all ACK/NACK transmissions by a repetition factor $N_{ANRep}$. $N_{ANRep}$ is provided by the higher layer and is valid until ACK/NACK repetition is disabled by the higher layer. PUCCH resources for initial ACK/NACK transmission are implicitly given using a smallest CCE index of a PDCCH for scheduling a PDSCH. In contrast, ACK/NACK is repeatedly transmitted $N_{ANRep}-1$ times using PUCCH resources $n^{(1)}_{PUCCH,ANRep}$ set by the higher layer.

In the case of Time Division Duplexing (TDD), ACK/NACK repetition is applied only to ACK/NACK bundling, but is not applied to ACK/NACK multiplexing.

In the case of Frequency Division Duplex (FDD), when a UE detects a PDSCH transmission thereto at subframe #n−4, the UE transmits ACK/NACK therefor at subframe #n. If ACK/NACK repetition is enabled, the UE transmits ACK/NACK corresponding to the PDSCH transmission detected at subframe #n−4 at subframes #n, #n+1, . . . , and #n$_{ANRep}$+N−1. During ACK/NACK repetition, a UE does not transmit another signal at #n, #n+1, . . . , and #n$_{ANRep}$+N−1. In the case of TDD, if the UE detects a PDSCH transmission at subframe(s) #n−4, the UE transmits ACK/NACK therefor at subframe #n. Here, k∈K and K is defined in consideration of a positional relationship of subframe #n and a TDD frame structure. If ACK/NACK repetition is enabled, the UE transmits ACK/NACK for PDSCH transmission detected at subframe(s) n−k at UL subframe #n and $N_{ANRep}-1$ subsequent UL subframes (subframes n, n_1, . . . , and n_$N_{ANRep}$). During ACK/NACK repetition, the UE does not transmit another signal at n, n_1, . . . , and n_$N_{ANRep}$.

An ACK/NACK repetition mode was introduced as a method of reliably transmitting ACK/NACK from UEs with restricted power to a base station. However, the conventional ACK/NACK repetition operation causes downlink and uplink resource waste. Referring to FIG. 6, if an ACK/NACK repetition mode having a repetition factor of 2 is set, DL and UL scheduling is not performed with respect to the UE at DL subframe #n+1. Accordingly, the larger the number of times of ACK/NACK repetition, the more subframes cannot be used.

In the case in which ACK/NACK repetition may not be performed due to a change in channel state (UE movement, environment change, etc.), setting of ACK/NACK repetition of the UE may be released. However, if an apparatus such as a UE or a relay node has mobility, a change in radio channel with time is relatively large. In this case, it is difficult to appropriately cope with channel change using a semi-statically set ACK/NACK repetition enabling/disabling method. In addition, if appropriate ACK/NACK transmission modes are set and released with respect to all UEs according to channel change, the burden of a scheduler is significantly large. Accordingly, as a preferable/practical method, all UEs or relay nodes belonging to a cell may operate in the same ACK/NACK transmission mode, based on cell size, etc.

Embodiment

The present invention proposes a method of adaptively performing ACK/NACK repetition according to channel state. For example, the present invention proposes a method of allowing new transmission start along with a previously set ACK/NACK repetition operation in the case in which a channel state becomes good and thus ACK/NACK repetition is not necessary. More specifically, new transmission start may forcibly restrict the number of times of the previously set ACK/NACK repetition of disable or deactivate subsequent ACK/NACK repetition. In addition, if two ACKs/NACKs overlap in the same UL subframe due to ACK/NACK repeated transmission, two ACKs/NACKs may be simultaneously transmitted. As another method, if two ACKs/NACKs overlap, transmission of specific ACK/NACK may be dropped. That is, if a plurality of ACKs/NACKs is transmitted through one subframe due to ACK/NACK repetition, a UE may not transmit some ACK/NACK.

Hereinafter, an embodiment of the present invention will be described in detail with reference to the drawings. In the following description, it is assumed that an ACK/NACK transmission mode is set by higher layer signaling. That is, in the present invention, on the assumption that an ACK/NACK transmission mode is primarily set by a higher layer, a method of adaptively performing ACK/NACK repetition according to a channel state when ACK/NACK repetition is enabled will be focused upon. Accordingly, the present invention may relate to a 2-step ACK/NACK transmission mode adjustment method. Higher layer signaling includes Broadcast Channel (BCH) signaling, Radio Resource Control (RRC) signaling and Medium Access Control (MAC) signaling. The ACK/NACK transmission mode may be signaled in a UE-specific manner, a UE group-specific manner or a cell-specific manner. The ACK/NACK transmission mode may be explicitly specified or indirectly/implicitly confirmed from a parameter associated with a cell size, etc.

In addition, in the following drawings and description, the case in which a difference (hereinafter, referred to as ACK/NACK timing) between a DL subframe for data reception and a UL subframe for ACK/NACK transmission in synchronous hybrid automatic repeat and request (HARQ) is four subframes. However, this case is only exemplary and ACK/NACK timing may have different values (e.g., 3, 5 and 6 subframes) according to system.

A communication system according to an embodiment of the present invention may perform new transmission (PDCCH/PDSCH) at DL subframe #n+a according to channel change even when a PDCCH/PDSCH is transmitted through DL subframe #n in a state in which an ACK/NACK repetition mode (repetition factor=$N_{ANRep}$) ($1 <= a <= N_{ANRep}-1$). If new transmission is performed at DL subframe #n+a, ACK/NACK therefor will be transmitted through UL subframe #n+a+4 and a subsequent UL subframe thereof. Thus, ACK/NACK for old data and ACK/NACK for new data may be scheduled to be transmitted at the same subframe.

Hereinafter, a method of transmitting/processing ACK/NACK in the case in which transmission of ACK/NACK for old data and transmission of ACK/NACK for new data are scheduled to the same subframe in a state in which an ACK/NACK repetition mode is set will be described. For convenience of description, although the case in which two ACKs/NACKs are transmitted at the same UL subframe in the following drawings and description, this is exemplary and the present invention is equally or easily applicable to the case in which a plurality of ACKs/NACKs is generated at the same UL subframe due to carrier aggregation, time division duplexing (TDD) or a relay system.

Method 1. ACK/NACK Simultaneous Transmission

In the case in which a plurality of ACKs/NACKs is scheduled to be transmitted through the same subframe in a state in which an ACK/NACK repetition mode is set, a method of simultaneously transmitting the plurality of ACKs/NACKs will be described. The plurality of ACKs/NACKs may be transmitted 1-1) using respective PUCCH resources, 1-2) using a combination of a PUCCH and a PUSCH, or 1-3) using a single physical channel (that is, a PUCCH or a PUSCH).

Method 1-1) ACK/NACK Simultaneous Transmission Using a Plurality of PUCCHs

For convenience, it is assumed that a PDCCH/PDSCH is transmitted through DL subframe #n and new transmission (PDCCH/PDSCH) is performed at DL subframe #n+a in a state in which an ACK/NACK repetition mode (repetition factor=$N_{ANRep}$) ($1 <= a <= N_{ANRep}-1$). In this case, ACK/NACK PUCCH resources for a PDSCH received at DL subframe #n may be set as follows. First, ACK/NACK resources at UL subframe #n+4 may be dynamically assigned in association with a CCE index of a PDCCH of DL subframe #n. For example, in the case of 3GPP LTE, an ACK/NACK PUCCH resource index is obtained by adding an appropriate offset to a smallest CCE index for PDCCH transmission as necessary. In contrast, ACK/NACK PUCCH resources used for ACK/NACK repeated transmission at UL subframes #n+5, ..., and #n+4+$N_{ANRep}$-1 may be determined by higher layer signaling. Similarly, ACK/NACK PUCCH resources at UL subframe #n+a+4 for data transmitted at DL subframe #n+a may be dynamically allocated in association with a CCE assignment position (index) of a PDCCH.

In this case, a UE simultaneously transmits a plurality of ACKs/NACKs at UL subframe #n+a+4. In this case, ACK/NACK for first data is transmitted through semi-statically configured PUCCH resources or ACK/NACK for second data is transmitted through dynamically configured PUCCH resources. A DL subframe for new transmission is preferably restricted to DL subframe #n+1 if a repetition factor is 2, to DL subframe #n+2 if a repetition factor is 3, and to DL subframe #n+3 if a repetition factor is 4. That is, a base station may perform scheduling such that an ACK/NACK repetition subframe for first data transmission and an ACK/NACK repetition subframe for second data transmission overlap only in one subframe. Therefore, it is possible to prevent the number of resources reserved for ACK/NACK repetition in the UL subframe in which ACK/NACK for new transmission and ACK/NACK for old transmission overlap from becoming 2 or more.

Method 1-2) ACK/NACK Simultaneous Transmission Using PUCCH+PUSCH

In the case of PUSCH transmission at a UL subframe in which transmission of a plurality of ACKs/NACKs is scheduled, some ACKs/NACKs may be transmitted in a state of being embedded in a PUSCH and the remaining ACKs/NACKs may be transmitted through a PUCCH. For example, if transmission of two ACKs/NACKs is scheduled in the same UL subframe, ACK/NACK for first data may be transmitted in a state of being embedded in a PUSCH, ACK/NACK for second data may be transmitted through dynamic PUCCH resources, and vice versa. Meanwhile, if data transmission is not performed in a UL subframe in which transmission of a plurality of ACKs/NACKs is scheduled, separate PUSCH resources only for ACK/NACK transmission may be assigned in order to implement the present method.

Method 1-3) ACK/NACK Simultaneous Transmission Through Single Physical Channel

If transmission of a plurality of ACKs/NACKs is scheduled in the same UL subframe, the ACKs/NACKs may be transmitted through a single physical channel (e.g., a PUCCH or a PUSCH). More specifically, if a PUSCH is transmitted in a UL subframe in which transmission of a plurality of ACKs/NACKs is scheduled, all ACKs/NACKs may be transmitted in a state of being embedded in the PUSCH. If data transmission is not performed in a UL subframe in which transmission of a plurality of ACKs/NACKs is scheduled, separate PUSCH resources only for ACK/NACK transmission may be assigned in order to implement the present method.

Next, a method of transmitting a plurality of ACKs/NACKs through a single PUCCH will be described. For convenience, it is assumed that transmission of two ACKs/NACKs is scheduled in the same UL subframe. In this case, two pieces of ACK/NACK information may be transmitted using ACK/NACK bundling or ACK/NACK multiplexing. ACK/NACK bundling is bundling of ACK/NACK results for a plurality of pieces of data to one value by a logical AND operation. Accordingly, ACK is transmitted if all of a plurality of pieces of data is successfully received and NACK is transmitted if at least one piece of data fails to be decoded. In ACK/NACK multiplexing, ACK/NACK results for a plurality of pieces of data are transmitted using a combination of ACK/NACK transmission resources and modulation (e.g., QPSK) values. More specifically, if two PUCCH resources are occupied for ACK/NACK transmission, a specific modulation value is transmitted using one PUCCH resource selected therefrom.

In the case in which a plurality of ACKs/NACKs is simultaneously transmitted in a UL subframe, the following problems may occur.

Restricted UE transmit power

Decrease in advantages obtained from a single frequency transmission scheme (e.g., increase in cubic metric (CM) value)

Hereinafter, a method for solving the above problems will be additionally described.

First, restricted UE transmit power will be described. In the case in which there is no power headroom according to transmit power of a UE, it is difficult to additionally start new transmission. Accordingly, a base station may schedule new DL transmission only to a UE having power headroom. Meanwhile, if the power headroom of a UE is dynamically changed, a power headroom value is dynamically changed. In order to appropriately utilize the power headroom, a base station may schedule new DL transmission to the UE if needed.

For scheduling of new DL transmission, a criterion as to when and how an ACK/NACK repetition mode is set needs to be designed. For example, if a channel state/quality value (e.g., a signal-to-interference plus noise ratio (SINR)) is greater than S1, ACK/NACK repetition may be possible. At this time, if the S1 value is set too small, ACK/NACK repetition is mostly enabled. In this case, as shown in FIG. 6, resource assignment at subframe #n+1 may be impossible and thus resource waste may become severe. In contrast, if the S1 value is set too large, ACK/NACK repetition is significantly restricted and thus ACK/NACK reception performance may be significantly deteriorated. Accordingly, the S1 value is appropriately selected to set an ACK/NACK repetition mode and new transmission is started at subframe #n+1 in consideration of excess power of a UE according to dynamic channel change, thereby increasing resource use efficiency.

If a UE receives a new PDSCH and simultaneously transmits ACK/NACK therefor while performing ACK/NACK repetition, power required to transmit a plurality of ACKs/NACKs (repeated ACK/NACK and new ACK/NACK) may be insufficient. For example, a sum of powers required to transmit two ACKs/NACKs determined by transmit power control may exceed a transmit power limit value. In this case, the limited transmit power is appropriately distributed to two ACK/NACKs using the following three methods.

Power distribution method 1: The transmit power limit value is equally distributed to two ACKs/NACKs (or is distributed according to an appropriate ratio).

Power distribution method 2: Power is preferentially assigned to the repeated ACK/NACK and the remaining power is assigned to the new ACK/NACK.

Power distribution method 3: Power is preferentially assigned to the new ACK/NACK and the remaining power is assigned to the repeated ACK/NACK.

While appropriate power is assigned to both ACKs/NACKs equally (or according to an appropriate ratio) in power distribution method 1, priority is given to one ACK/NACK so as to enable one ACK/NACK to be stably transmitted with sufficient power in power distribution methods 2 and 3.

Next, a problem wherein a single frequency transmission scheme is damaged will be described. Currently, in the LTE-advanced (LTE-A) system, as necessary, uplink single-frequency transmission is abandoned and multi-frequency transmission is allowed. That is, in some cases, a PUCCH and a PUSCH may be simultaneously transmitted. For example, if it is determined that a channel state is very good and thus performance deterioration due to deterioration in a CM property may be compensated for, simultaneous multi-channel transmission is applicable. Similarly, a plurality of PUCCHs (e.g., ACKs/NACKs) (e.g. two) may be simultaneously transmitted. Accordingly, dynamically assigned ACK/NACK resources (physical layer) and semi-statically assigned ACK/NACK resources (higher layer) may be simultaneously transmitted in a certain UL subframe. Allowing new transmission means that a channel state is good. Thus, in this case, simultaneous transmission may be possible. A base station or a relay node preferably decides whether or not new transmission will be performed in consideration of simultaneous transmission.

Method 2. Dropping and Stopping of Transmission of Some ACKs/NACKs

A method of dropping, stopping, or temporarily stopping transmission of some ACKs/NACKs in the case in which a plurality of ACK/NACKs is scheduled to be transmitted through the same subframe in a state in which an ACK/NACK repetition mode is set may be considered. For convenience, it is assumed that two ACKs/NACKs are scheduled to be transmitted in the same UL subframe. In this case, if the plurality of ACKs/NACKs is scheduled to be simultaneously transmitted, a procedure of dropping, stopping or temporarily stopping repeated transmission of ACK/NACK for old data in the corresponding UL subframe may be performed. If repeated transmission of ACK/NACK for old data is abandoned, initial ACK/NACK for new data may be transmitted using static resources for previous ACK/NACK instead of dynamic resources. Through this operation, the UE may acknowledge that the base station schedules ACKs/NACKs to overlap (UE-to-eNB confirmation). As another method, in the case in which new DL data transmission is performed, it may be determined that a channel state becomes good or priority may be given to ACK/NACK for old data and thus a procedure of dropping, stopping or temporarily stopping transmission of ACK/NACK for new data in the UL subframe may be performed.

Method 3: Change of ACK/NACK Repetition Mode

If a base station schedules ACKs/NACKs to be simultaneously transmitted, an ACK/NACK repetition mode may be changed along with the above-described methods 1 and/or 2. Change in the ACK/NACK repetition mode includes reduction in ACK/NACK repetition factor and stopping of an ACK/NACK repetition mode. If ACKs/NACKs are scheduled to be simultaneously transmitted, change in ACK/NACK repetition mode is temporarily applied to the corresponding ACK/NACK transmission or continuously applied to ACK/NACK transmission subsequent thereto.

More specifically, if repeated ACK/NACK and new ACK/NACK are present in the same UL subframe, it is determined that a channel state becomes good and the number of times of ACK/NACK repetition may be forcibly restricted. Restriction of the number of times of ACK/NACK repetition may be independently applied to ACK/NACK for old data and ACK/NACK for new data. For example, if priority is given to new ACK/NACK, a repetition factor for repeated ACK/NACK may be reduced such that the repeated ACK/NACK and the new ACK/NACK do not overlap. Such an operation may mean that the repeated ACK/NACK transmission is dropped or stopped such that two ACKs/NACKs do not overlap in a state in which the ACK/NACK repetition factor is maintained. Alternatively, only an ACK/NACK repetition factor of the new ACK/NACK may be reduced.

If ACKs/NACKs are scheduled to overlap, it is determined that a channel state is good and an ACK/NACK repetition mode may be stopped. Stopping of the ACK/NACK repetition mode may be temporarily applied to the corresponding ACK/

NACK or continuously applied to ACK/NACK subsequent to the corresponding ACK/NACK. For convenience, temporarily stopping the ACK/NACK repetition mode only with respect to the corresponding ACK/NACK means that the ACK/NACK repetition mode is disabled and continuously stopping the ACK/NACK repetition mode with respect to the ACK/NACK subsequent to the corresponding ACK/NACK means that the ACK/NACK repetition mode is deactivated, which may be used interchangeably with each other.

Although methods 1 to 3 are separately described for convenience, these methods may be combined or selectively used. In addition, the sub-methods 1-1 to 1-3 of method 1 may be combined or selectively used according to an ACK/NACK transmission situation/scenario. The operation of the UE according to the above-described methods 1 to 3 may be defined or signaled in advance. The operation of the UE may be enabled or disabled through higher layer signaling.

Hereinafter, the embodiments of the present invention will be described in detail with reference to the drawings. The subject matters shown in the drawings may be combined and used.

FIGS. 7 to 10 are diagrams showing examples of repeatedly transmitting ACK/NACK according to an embodiment of the present invention. In FIGS. 7 to 10, it is assumed that a packet A is transmitted at DL subframe #n and a new packet B is transmitted at DL subframe #n+1 in the case in which a repetition factor is 2.

Figure 7:
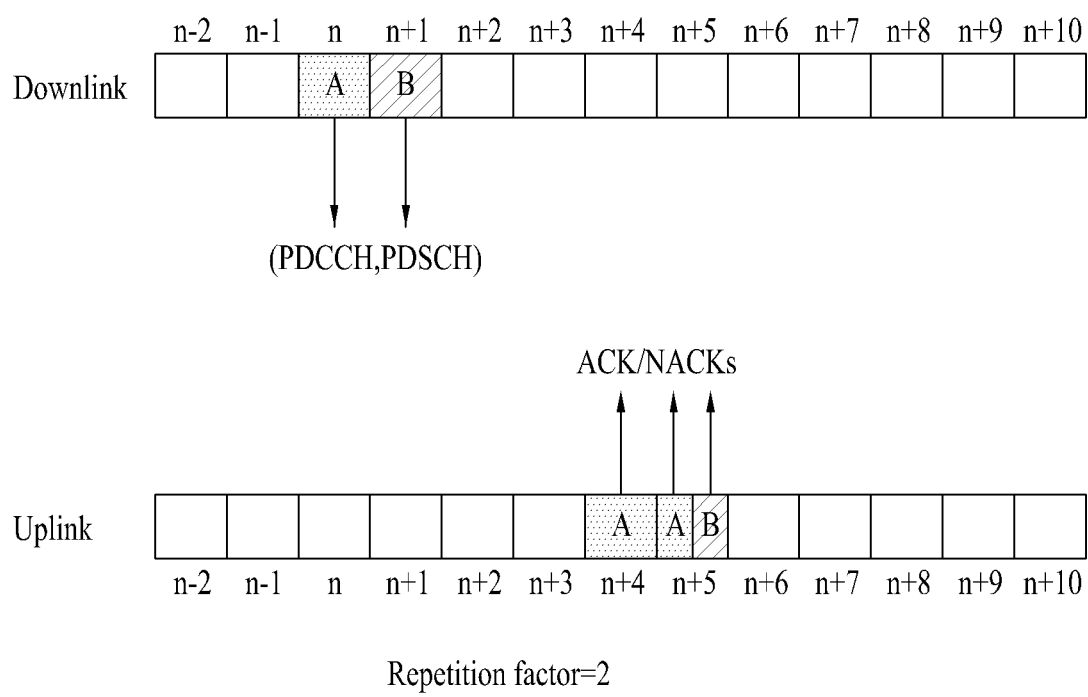
FIGS. 7 to 10 are diagrams showing examples of repeatedly transmitting ACK/NACK in the case in which a repetition factor is 2 according to an embodiment of the present invention.

Referring to FIG. 7, ACK/NACK (A) for the packet A is repeatedly transmitted at UL subframes #n+4 and #n+5. However, ACK/NACK (B) for the packet B is transmitted only at UL subframe #n+5 and is no longer repeatedly transmitted. In the present example, although the ACK/NACK repetition mode is set through higher layer signaling, a physical layer may activate or deactivate the mode as necessary. If the ACK/NACK repetition mode is continuously deactivated by the packet B, there is a method of reactivating the ACK/NACK repetition mode. Therefore, for example, separate signaling (e.g., RRC signaling) for activating the ACK/NACK repetition mode may be performed. As another example, if a transmit interval of a DL packet corresponds to a repetition factor (that is, an interval of two DL subframes), the ACK/NACK repetition mode may be regarded as being automatically activated. The ACK/NACK repetition mode may be regarded as being temporarily stopped (that is, disabled) only with respect to ACK/NACK (B) for the packet B.

Referring to FIG. 7, the repeated ACK/NACK (A) for the packet A and the new ACK/NACK (B) for the packet B are transmitted at UL subframe #n+5. In this case, two ACKs/NACKs may be transmitted using two PUCCH channels. As another example, if a PUCCH is transmitted, one of two ACKs/NACKs may be embedded in the PUSCH. Accordingly, one PUCCH and one PUSCH are transmitted. As another example, if a PUSCH is transmitted, both ACKs/NACKs may be transmitted through the PUSCH.

Figure 8:
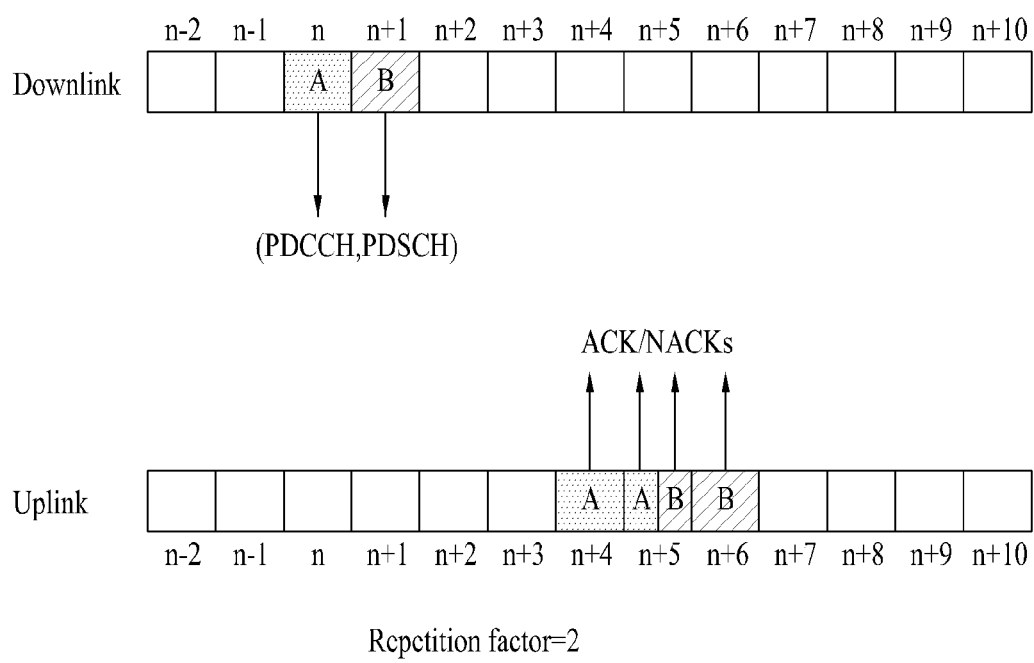

Referring to FIG. 8, the ACK/NACK (A) for the packet A is repeatedly transmitted at UL subframes #n+4 and #n+5. In addition, the ACK/NACK (B) for the packet B is repeatedly transmitted at UL subframes #n+5 and #n+6. That is, the repetition mode for the ACK/NACK (B) is validly maintained. In this case, ACK/NACK repetition may be deactivated or disabled in next transmission of the packet B (or ACK/NACK (B)).

Figure 9:
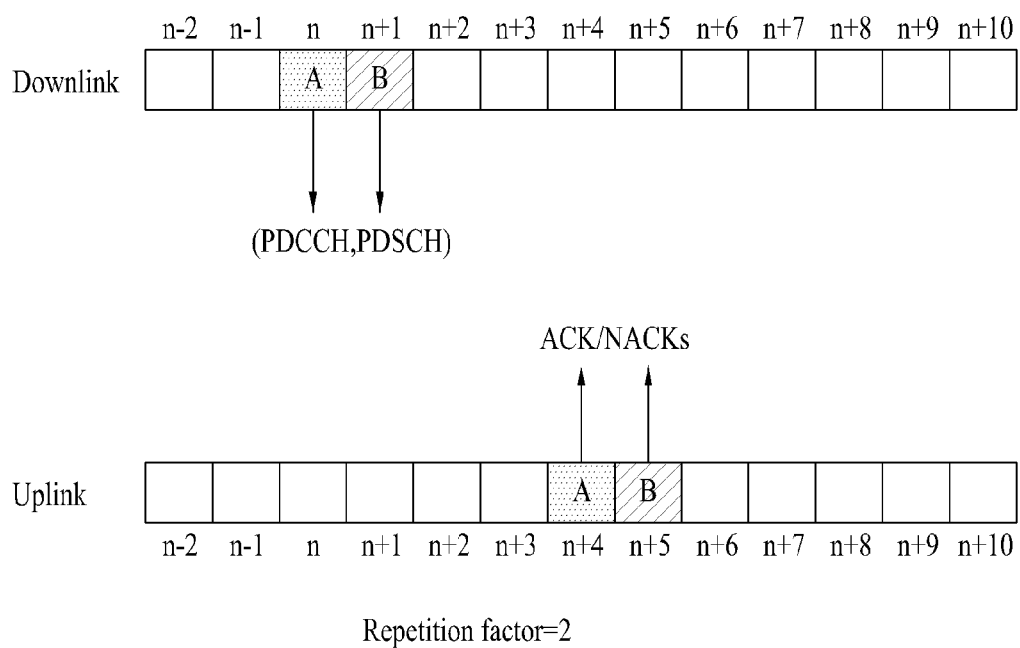

Referring to FIG. 9, the ACK/NACK (A) for the packet A is transmitted only at UL subframe #n+4 once. In addition, the ACK/NACK (B) for the packet B is transmitted only at UL subframe #n+5 once. That is, if new ACK/NACK transmission is necessary during ACK/NACK repetition, repetition of the ACK/NACK (A) and the ACK/NACK (B) is stopped. Stopping of ACK/NACK repetition may mean that ACK/NACK repetition is continuously deactivated or is temporarily stopped. In the example of FIG. 9, the ACKs/NACKs (A and B) are not repeatedly transmitted, but are transmitted only once. In addition, in the example of FIG. 9, the repetition mode of the ACK/NACK (A) is maintained, but transmission of ACK/NACK (A) at subframe #n+5 is abandoned for some reason and only the repetition factor of the ACK/NACK (B) is reduced.

Figure 10:
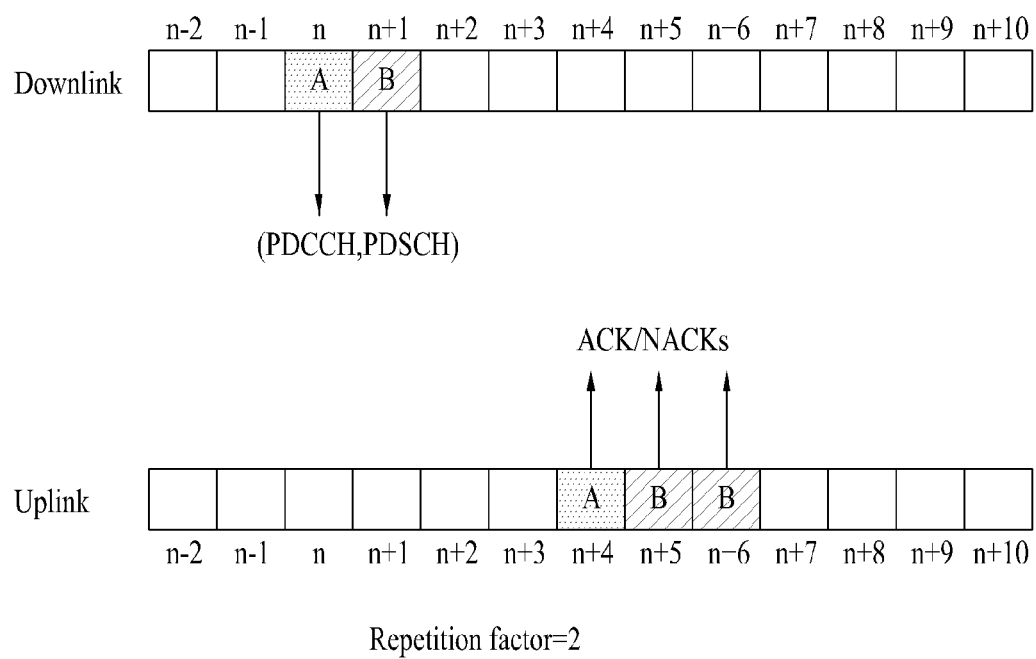

Referring to FIG. 10, the ACK/NACK (A) for the packet A is transmitted only at UL subframe #n+4 once. In contrast, the ACK/NACK (B) for the packet B is repeatedly transmitted at UL subframes #n+5 and #n+6. That is, repeated transmission of the ACK/NACK (A) is temporarily stopped and the ACK/NACK (B) is repeatedly transmitted as scheduled. This means that priority is given to the new transmission of the ACK/NACK (B). In this case, if the repeated transmission of the ACK/NACK (A) (UL subframe #n+5) for old data is abandoned, initial ACK/NACK (B) (UL subframe #n+5) for new data may be transmitted using static resources for old ACK/NACK (A) instead of dynamic resources. Through this operation, the UE may acknowledge that the base station schedules ACKs/NACKs to overlap. In the example of FIG. 10, the ACK/NACK (A) is not repeatedly transmitted but is transmitted only once and the ACK/NACK (B) is repeatedly transmitted. This means that the ACK/NACK repetition factor for the ACK/NACK (A) is reduced.

FIGS. 11 to 16 are diagrams showing examples of repeatedly transmitting ACK/NACK according to an embodiment of the present invention. In FIGS. 11 to 16, it is assumed that, if the repetition factor is 3, a packet A is transmitted at DL subframe #n and a new packet B is transmitted at DL subframe #n+2. Although not shown, the packet B may be transmitted through DL subframe #n+1.

Figure 11:
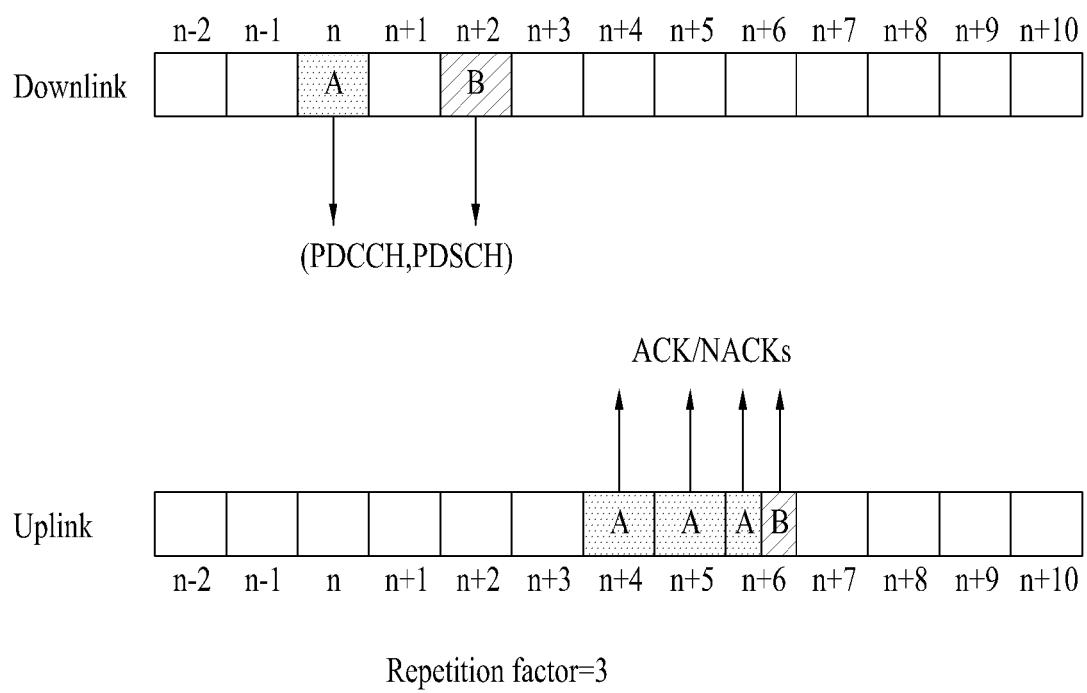
FIGS. 11 to 16 are diagrams showing examples of repeatedly transmitting ACK/NACK in the case in which a repetition factor is 3 according to an embodiment of the present invention.

Referring to FIG. 11, the ACK/NACK (A) for the packet A is repeatedly transmitted three times at UL subframes #n+4, #n+5 and #n+6. However, the ACK/NACK (B) for the packet B is transmitted only at UL subframe #n+6 and is not repeatedly transmitted. That is, the ACK/NACK repetition mode may be continuously deactivated or disabled by new transmission (B). Since FIG. 11 is similar to FIG. 7 except that the repetition factor is 3, for detailed description of FIG. 11, refer to the description of FIG. 7.

Figure 12:
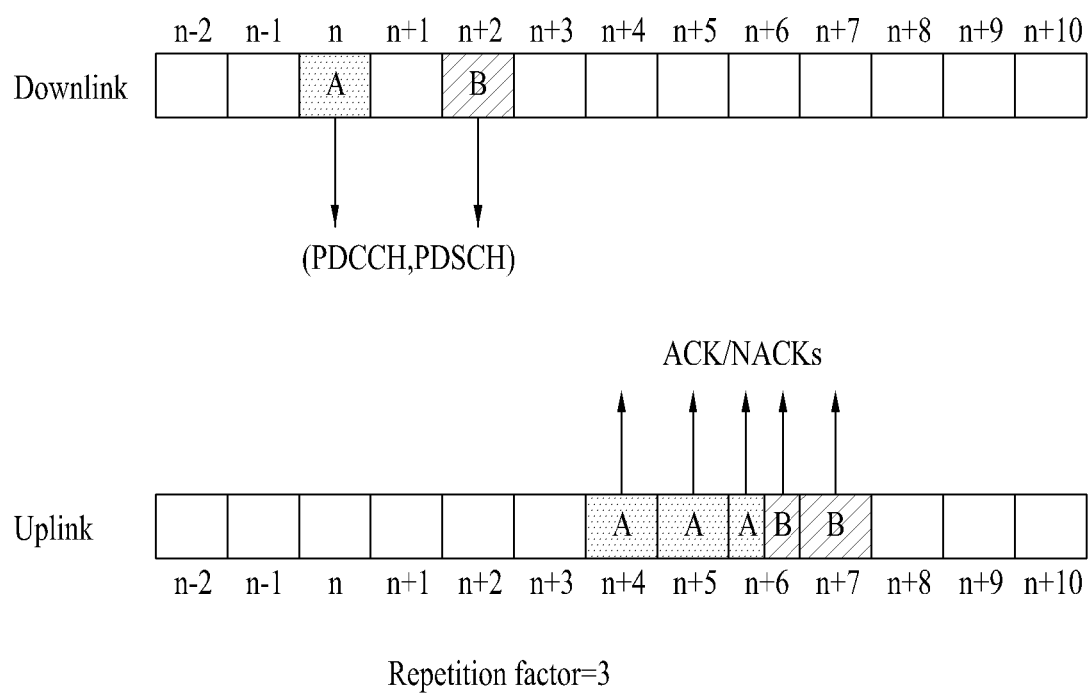

Referring to FIG. 12, the ACK/NACK (A) for the packet A is repeatedly transmitted three times at UL subframes #n+4, #n+5 and #n+6. However, the ACK/NACK (B) for the packet B is repeatedly transmitted two times at UL subframes #n+6 and #n+7. That is, the repetition factor of the ACK/NACK (B) of new transmission (B) is reduced from 3 to 2. That is, in the present example, a physical layer may change the ACK/NACK repetition factor set by higher layer signaling as necessary. Reduction in repetition factor may be temporarily applied to the ACK/NACK (A) and the ACK/NACK (B). Alternatively, reduction in repetition factor may be continuously applied to the subsequent process. If the repetition factor is reduced, separate signaling (e.g., RRC signaling) for returning the repetition factor to an original value may be necessary. As another example, if a transmit interval of a DL packet corresponds to a predetermined repetition factor (that is, an interval of three DL subframes), the repetition factor may be automatically returned from 2 to 3.

Figure 13:
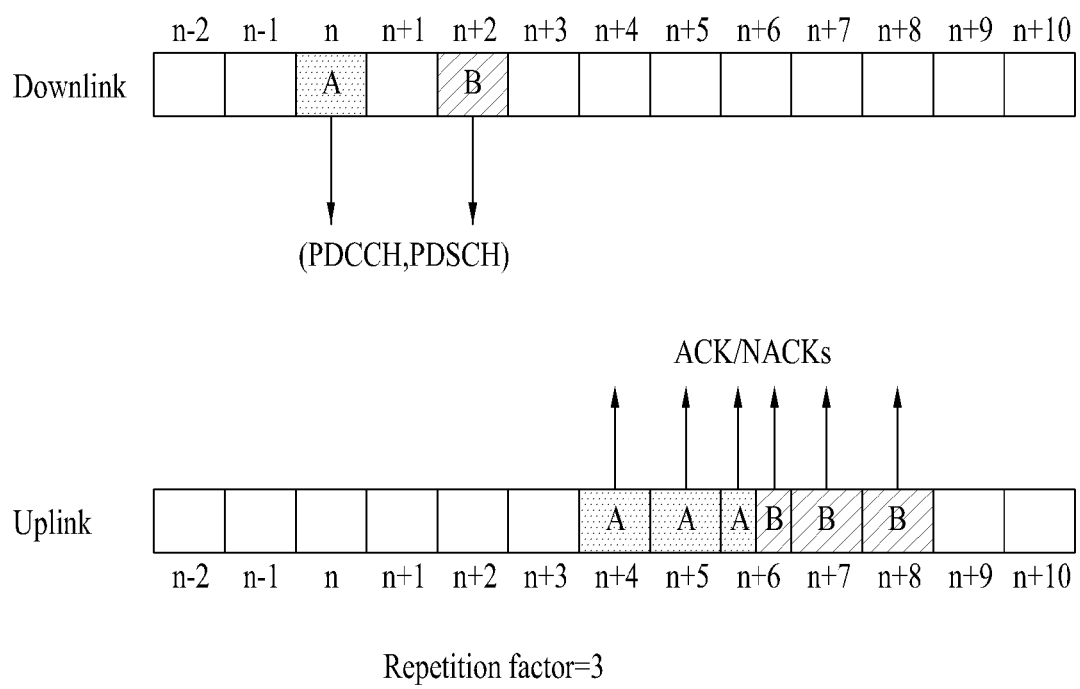

Referring to FIG. 13, the ACK/NACK (A) for the packet A is repeatedly transmitted three times at UL subframes #n+4, #n+5 and #n+6. Similarly, the ACK/NACK (B) for the packet B is repeatedly transmitted three times at UL subframes #n+6, #n+7 and #n+8. That is, the repetition mode of the ACK/

NACK (B) is validly maintained. In this case, ACK/NACK repetition may be deactivated or disabled in next transmission of the packet B (or ACK/NACK (B)). FIG. 13 is similar to FIG. 8 except that the repetition factor is 3.

Figure 14:
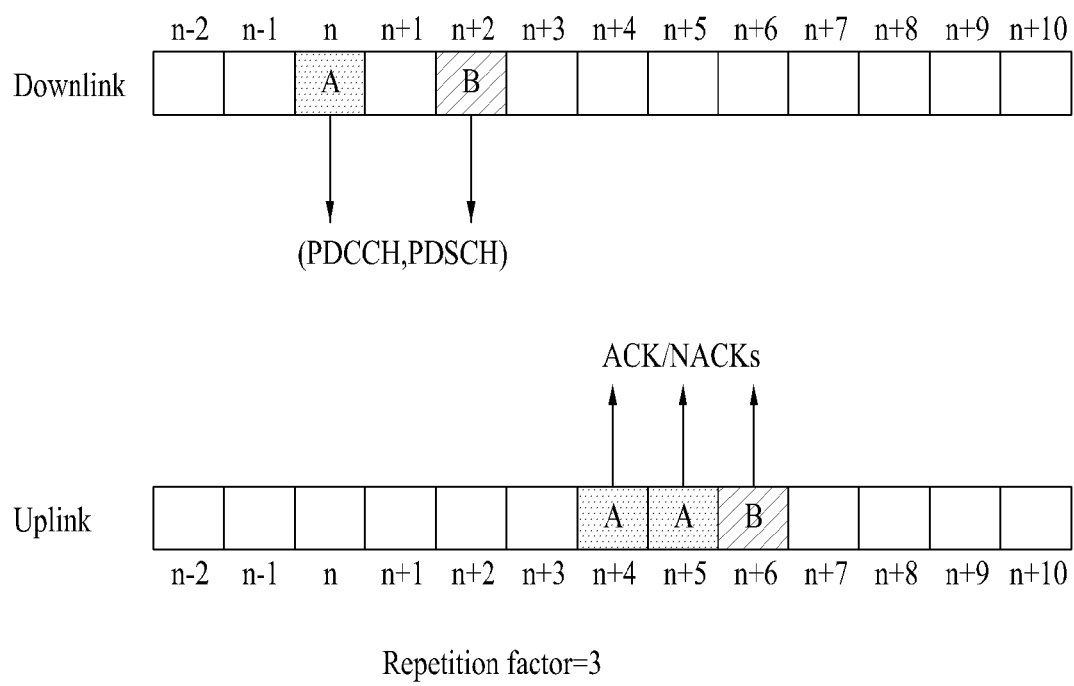

Referring to FIG. 14, the ACK/NACK (A) for the packet A is repeatedly transmitted two times at UL subframes #n+4 and #n+5. In contrast, the ACK/NACK (B) for the packet B is transmitted only at UL subframe #n+6 and is not repeatedly transmitted. That is, the number of times of repetition of the ACK/NACK (A) is reduced due to reduction in repetition factor or transmission abandonment of the ACK/NACK (A) at the UL subframe #n+6. The ACK/NACK (A) is repeatedly transmitted as scheduled and the repeated transmission of the ACK/NACK (B) is no longer performed or is temporarily performed. That is, the repeated transmission of the ACK/NACK (B) is deactivated or disabled. FIG. 14 is similar to FIG. 9 except that the repetition factor is 3.

Figure 15:
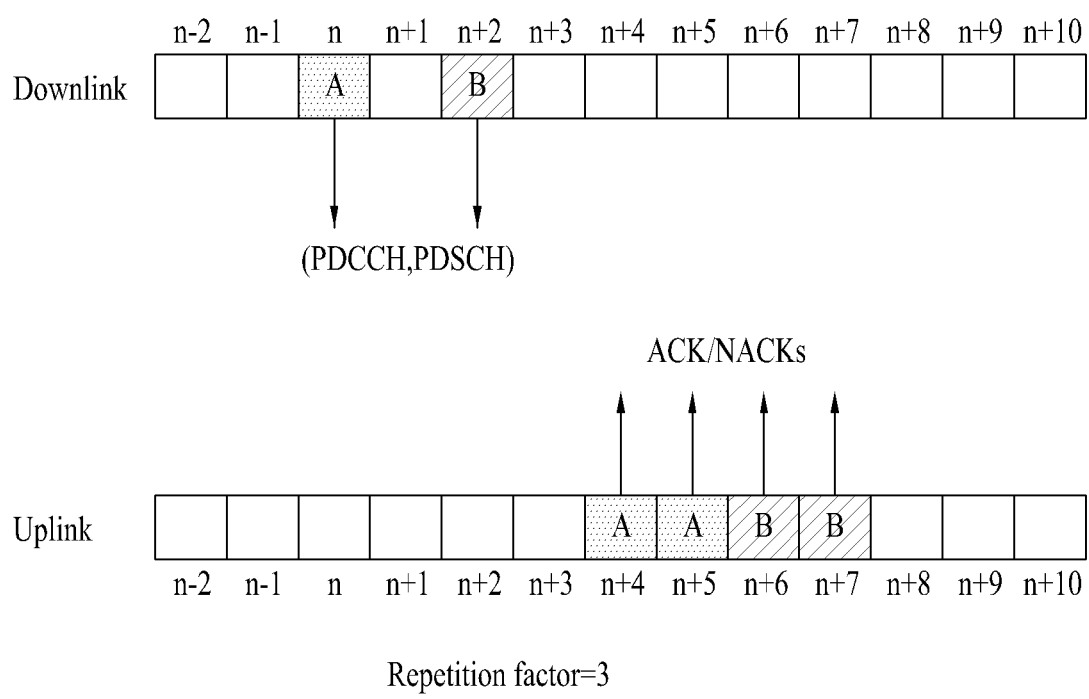

Referring to FIG. 15, the ACK/NACK (A) for the packet A is repeatedly transmitted two times at UL subframes #n+4 and #n+5. Similarly, the ACK/NACK (B) for the packet B is repeatedly transmitted two times at UL subframes #n+6 and #n+7. FIG. 15 shows the case in which the repetition factors of the ACK/NACK (A) and the ACK/NACK (B) are reduced from 3 to 2. That is, in this example, a physical layer may change the ACK/NACK repetition factor set by high layer signaling as necessary. Reduction in repetition factor may be continuously applied only to ACK/NACK (A) and ACK/NACK (B). Reduction in repetition factor may be continuously applied to the subsequent process. If the repetition factor is reduced, separate signaling (e.g., RRC signaling) for returning the repetition factor to an original value may be necessary. As another example, if a transmit interval of a DL packet corresponds to a predetermined repetition factor (that is, an interval of three DL subframes), the repetition factor may be regarded as being automatically returned from 2 to 3.

The example of FIG. 15 shows the case in which the repetition mode of ACK/NACK (A) is maintained and ACK/NACK (A) transmission at UL subframe #n+6 is abandoned for some reason. That is, the repetition factor may be regarded as being reduced only with respect to ACK/NACK (B). FIG. 15 is similar to FIG. 9 except that the repetition factor is 3.

Figure 16:
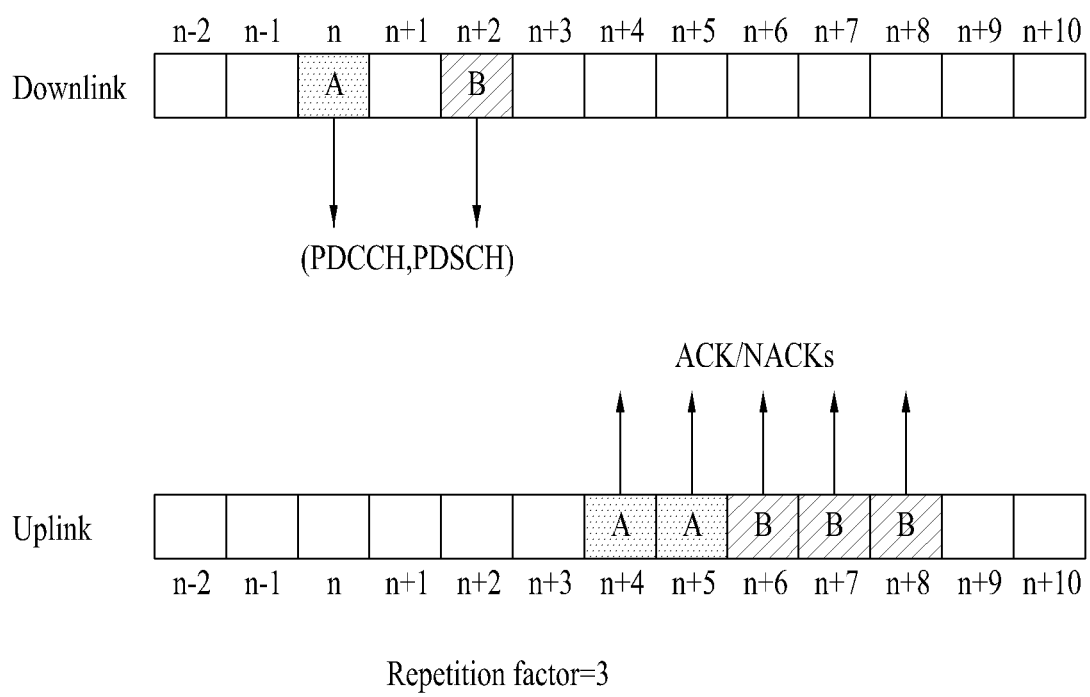

Referring to FIG. 16, ACK/NACK (A) for the packet A is repeatedly transmitted two times at UL subframes #n+4 and #n+5. In contrast, ACK/NACK (B) for the packet B is repeatedly transmitted three times at UL subframes #n+6, #n+7 and #n+8. That is, repeated transmission of ACK/NACK (A) is temporarily stopped and ACK/NACK (B) is repeatedly transmitted as scheduled. In this example, priority is given to ACK/NACK (B) for new transmission. FIG. 16 is similar to FIG. 10 except that the repetition factor is 3.

FIGS. 17 to 26 are diagrams showing examples of repeatedly transmitting ACK/NACK according to an embodiment of the present invention.

In FIGS. 17 to 23, it is assumed that a packet A is transmitted at DL subframe #n and a new packet B is transmitted at DL subframe #n+3 in the case in which a repetition factor is 4. Although not shown, the packet B may be transmitted even at DL subframes #n+1 and #n+2.

Figure 17:
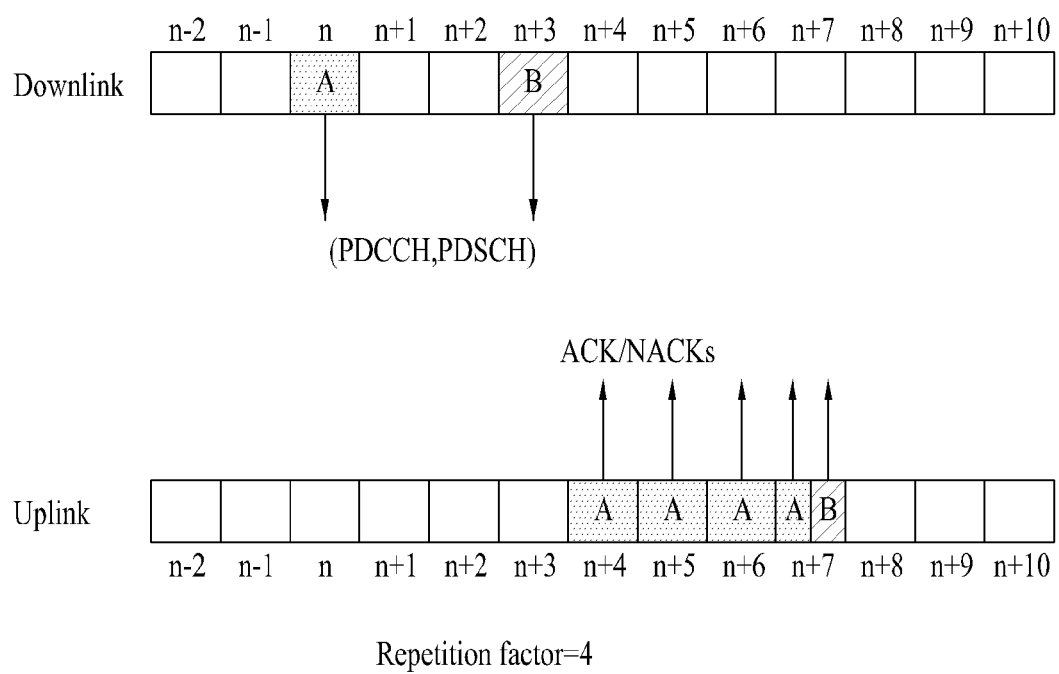
FIGS. 17 to 25 are diagrams showing examples of repeatedly transmitting ACK/NACK in the case in which a repetition factor is 4 according to an embodiment of the present invention.

Referring to FIG. 17, ACK/NACK (A) for the packet A is repeatedly transmitted four times at UL subframes #n+4, #n+5, #n+6 and #n+7. In contrast, ACK/NACK (B) for the packet B is transmitted at UL subframe #n+7 and is no longer repeatedly transmitted. That is, the ACK/NACK repetition mode may be continuously deactivated or temporarily disabled by new transmission (B). FIG. 17 is similar to FIGS. 7 and 11 except that the repetition factor is 4.

Figure 18:
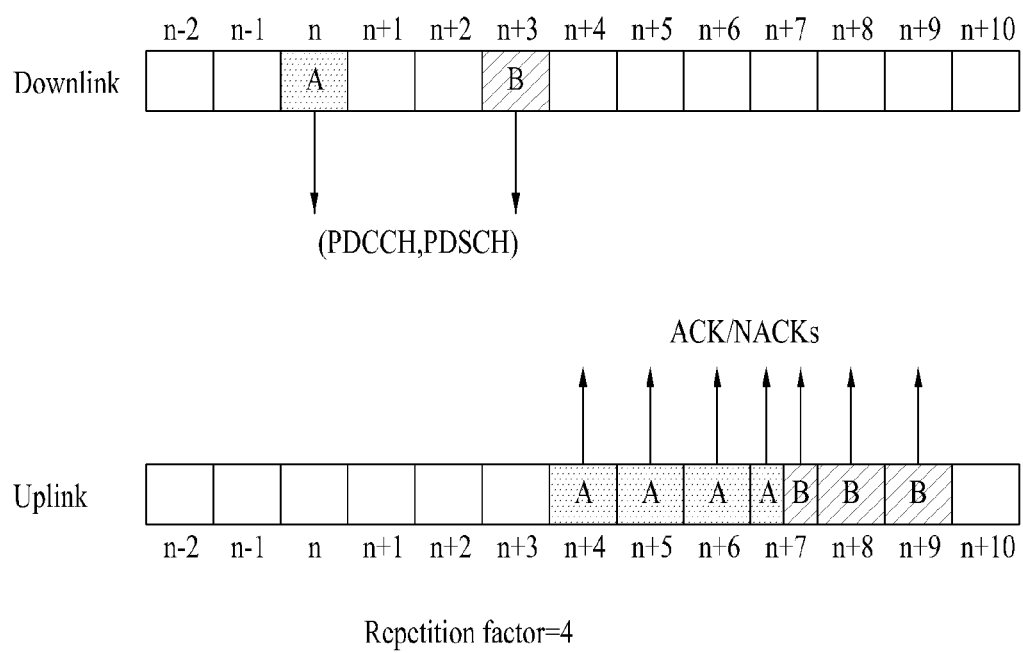

Referring to FIG. 18, ACK/NACK (A) for the packet A is repeatedly transmitted four times at UL subframes #n+4, #n+5, #n+6 and #n+7. In contrast, ACK/NACK (B) for the packet B is repeatedly transmitted three times at UL subframes #n+7, #n+8 and #n+9. That is, the repetition factor of ACK/NACK (B) for new transmission (B) is reduced (e.g., from 4 to 3). FIG. 18 is similar to FIG. 12 except that the repetition factor is 4.

Figure 19:
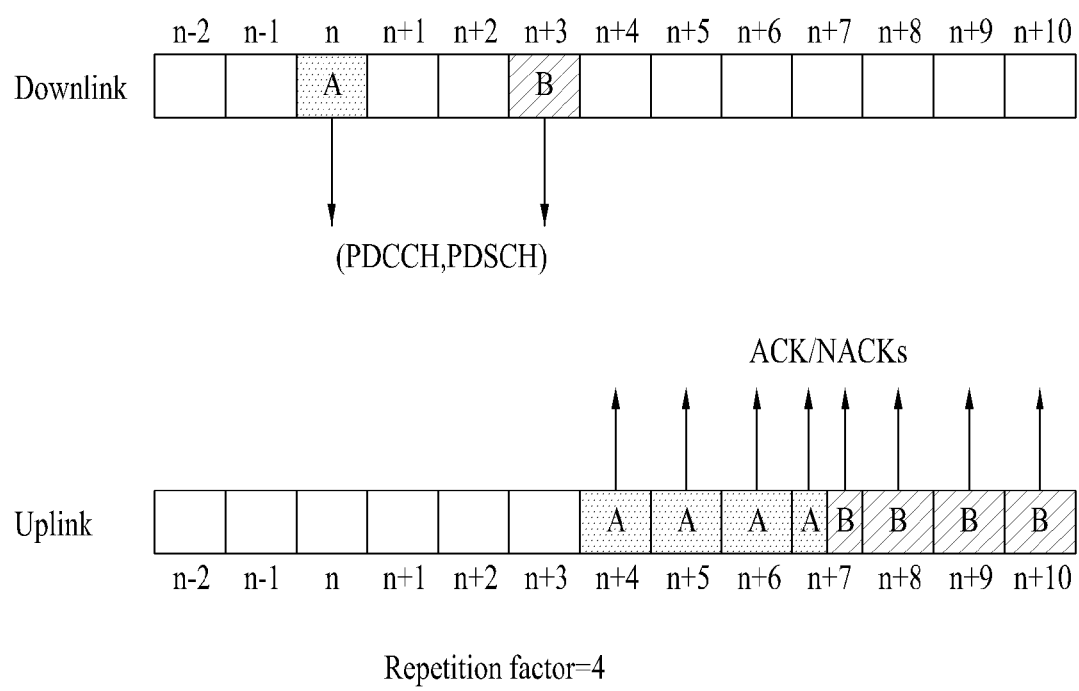

Referring to FIG. 19, ACK/NACK (A) for the packet A is repeatedly transmitted four times at UL subframes #n+4, #n+5, #n+6 and #n+7. Similarly, ACK/NACK (B) for the packet B is repeatedly transmitted four times at UL subframes #n+7, #n+8, #n+9 and #n+10. That is, the repetition mode of the ACK/NACK (B) is validly maintained. In this case, ACK/NACK repetition may be deactivated or disabled with respect to transmission subsequent to the packet B (or ACK/NACK (B). FIG. 19 is similar to FIGS. 8 and 13 except that the repetition factor is 4.

The example of FIG. 19 will be further described. If ACK/NACK repetition is performed with respect to the packet A transmitted at DL subframe #n, a PDSCH is not transmitted at DL subframes #n+1 and #n+2 and thus a UE does not need to decode the PDSCH. Accordingly, even when a certain PDSCH is transmitted at subframes #n+1 and #n+2, the UE does not transmit ACK/NACK therefor. Meanwhile, if the UE receives a PDSCH at DL subframe #n+3, the UE should transmit ACK/NACK therefor at subframe #n+7. Although subframe #n+7 is originally scheduled to transmit ACK/NACK for the packet A, in this example, the UE ignores the scheduling and transmits ACK/NACK for the packet B.

Figure 20:
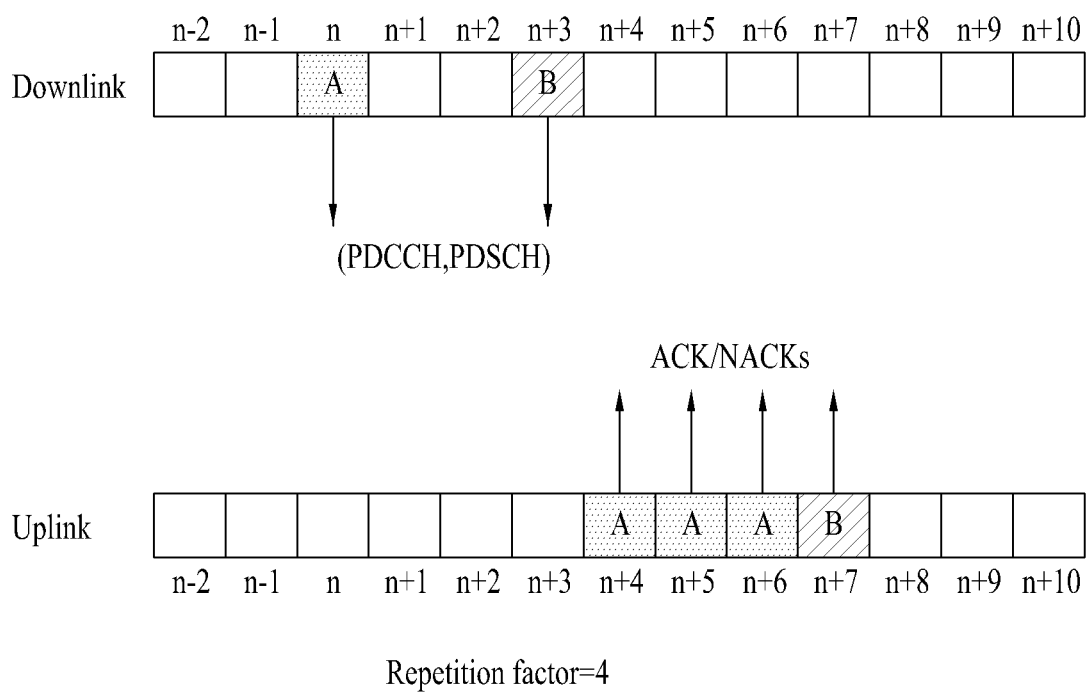

Referring to FIG. 20, ACK/NACK (A) for the packet A is repeatedly transmitted three times at UL subframes #n+4, #n+5 and #n+6. However, ACK/NACK (B) for the packet B is transmitted only at UL subframe #n+7 and is no longer repeatedly transmitted. That is, the number of times of repetition of ACK/NACK (A) is reduced by 1 and, instead, ACK/NACK (B) is transmitted. The UE may recognize the situation of FIG. 20 and, in this case, perform a series of procedures of transmitting ACK/NACK (B) instead of ACK/NACK (A) at UL subframes in which two ACKs/NACKs are required to be transmitted. FIG. 20 is similar to FIGS. 9 and 14 except that the repetition factor is 4.

Figure 21:
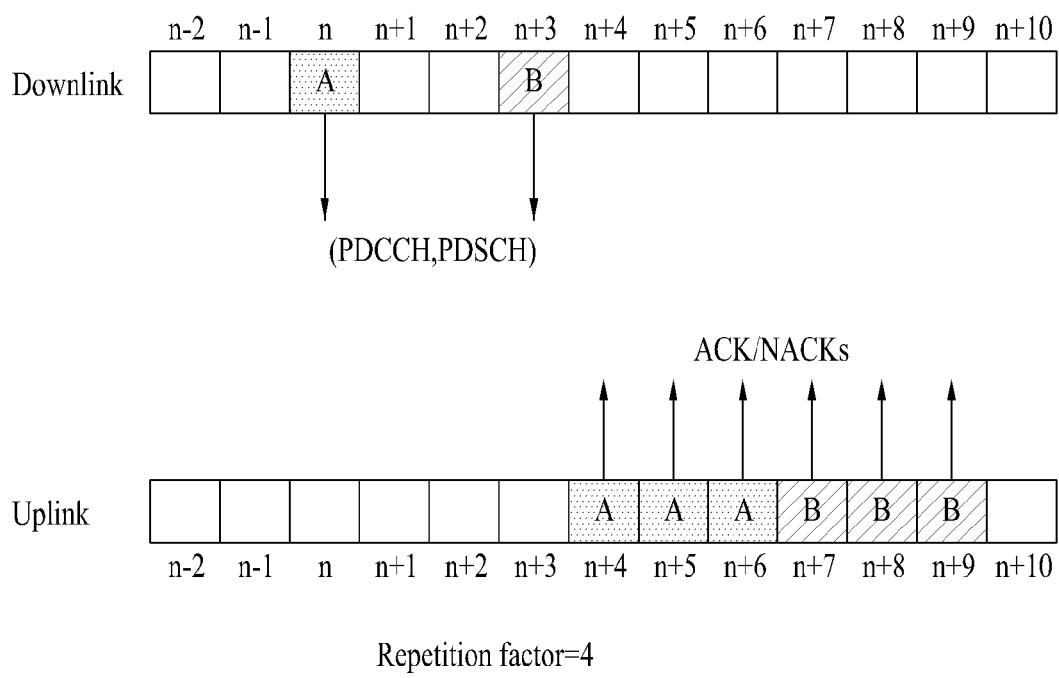

Referring to FIG. 21, ACK/NACK (A) for the packet A is repeatedly transmitted three times at UL subframes #n+4, #n+5 and #n+6. Similarly, ACK/NACK (B) for the packet B is repeated three times at UL subframes #n+7, #n+8 and #n+9. In FIG. 21, the repetition factors of ACKs/NACKs (A) and (B) are equally reduced (e.g., from 4 to 3). In FIG. 21, the repetition factor of ACK/NACK (A) is maintained but the number of times of repetition is reduced due to transmission abandonment of ACK/NACK (A) at UL subframe #n+7 for some reason. That is, the repetition factors of ACK/NACK (A and B) may be regarded as being reduced. FIG. 21 is similar to FIGS. 9 and 15 except that the repetition factor is 4.

Figure 22:
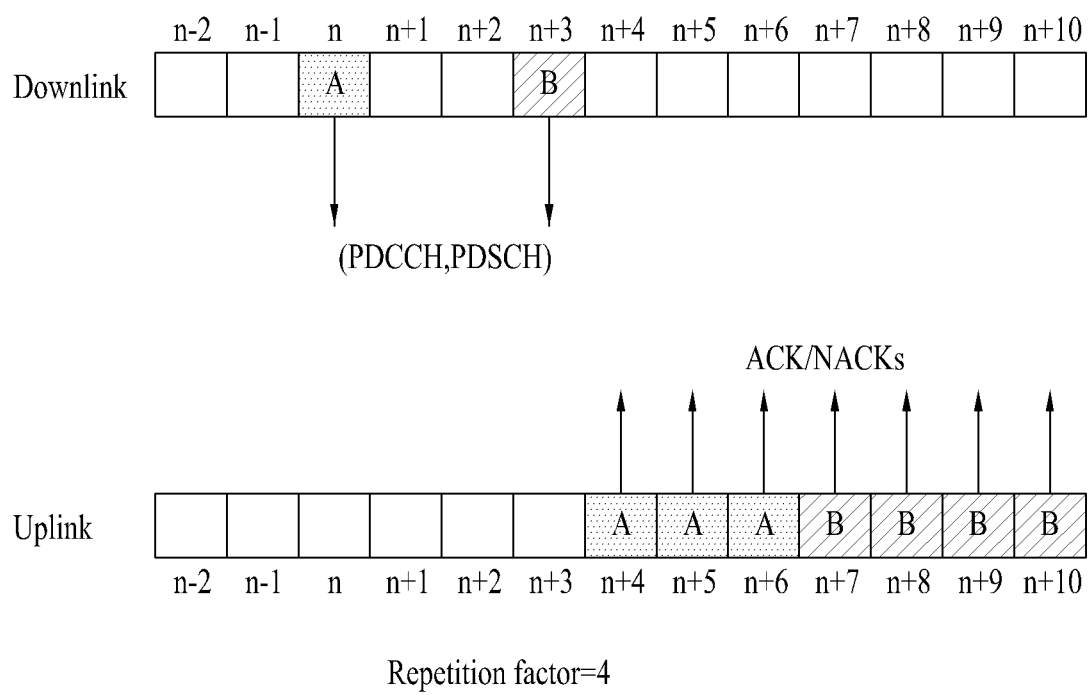

FIG. 22 shows the case in which priority is given to ACK/NACK (B) for new transmission. Referring to FIG. 22, ACK/NACK (A) for the packet A is repeatedly transmitted three times at UL subframes #n+4, #n+5 and #n+6. In contrast, ACK/NACK (B) for the packet B is repeatedly transmitted four times at UL subframes #n+7, #n+8, #n+9 and #n+10. That is, repeated transmission of ACK/NACK (A) is temporarily stopped and ACK/NACK (B) is repeatedly transmitted as scheduled. In UL subframes in which both ACK/NACK (A) transmission and ACK/NACK (B) transmission are scheduled, ACK/NACK (A) transmission is dropped by the UE. FIG. 22 is similar to FIGS. 16 and 10 except that the repetition factor is 4.

Figure 23:
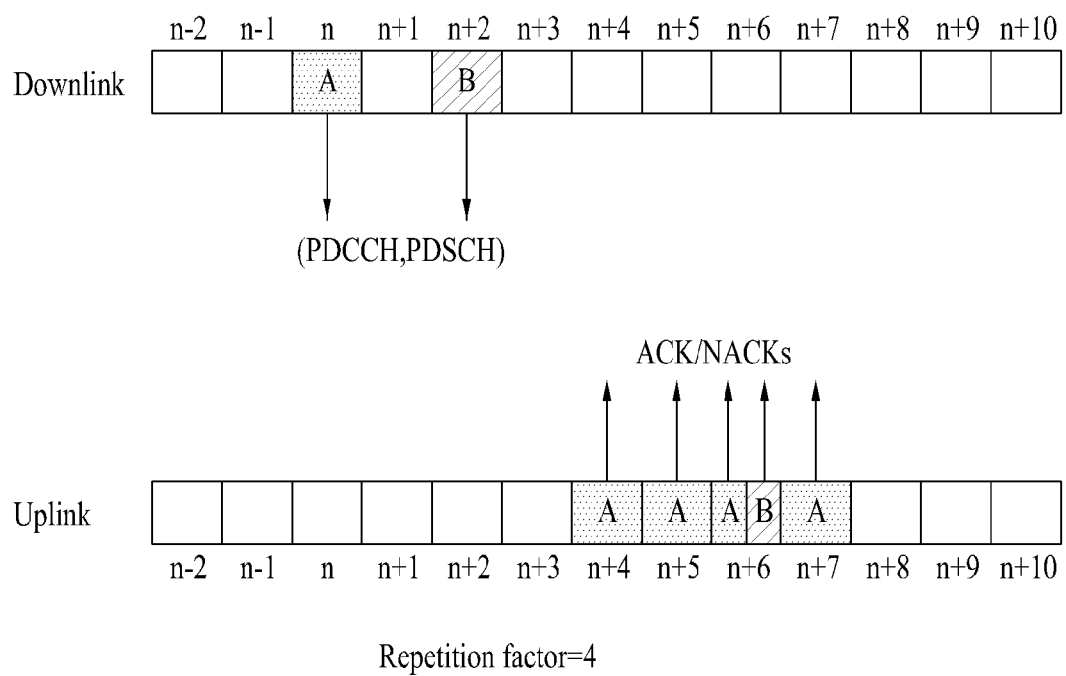
Figure 24:
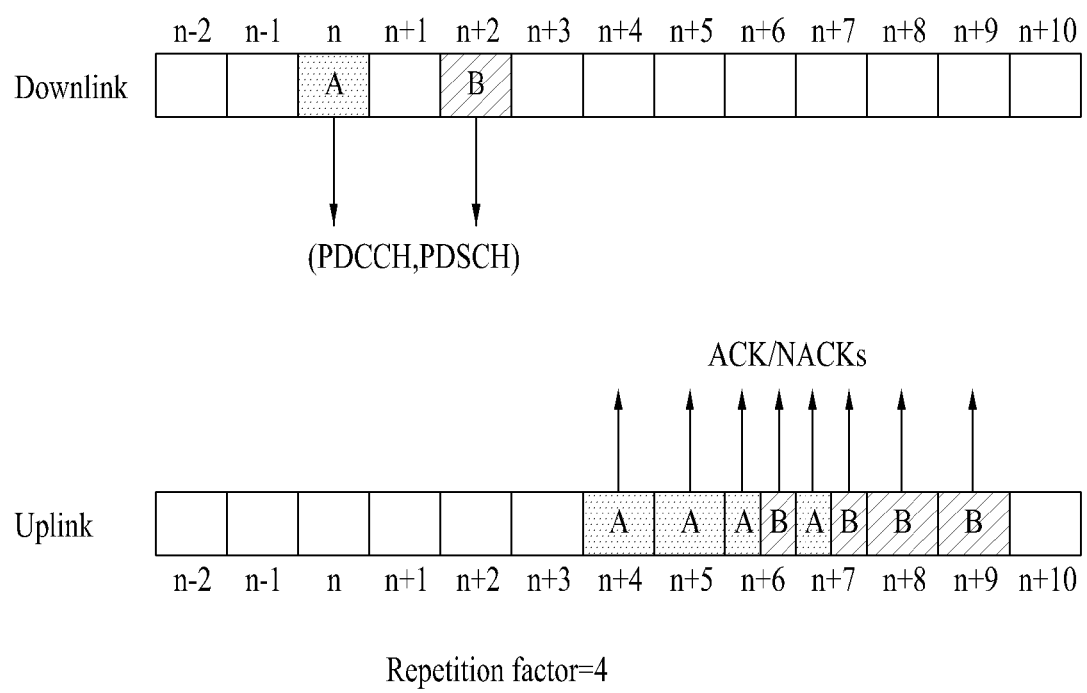

In FIGS. 23 to 24, it is assumed that a packet A is transmitted at DL subframe #n and a new packet B is transmitted at DL subframe #n+2 in the case in which a repetition factor is 4. Although not shown, the packet B may be transmitted even at DL subframes #n+1 and #n+3.

FIG. 23 shows an example of moving transmission of ACK/NACK (B) forward while maintaining repeated transmission of ACK/NACK (A) to the maximum. Referring to FIG. 23, ACK/NACK (A) for the packet A is repeatedly transmitted at four times at UL subframes #n+4, #n+5, #n+6 and #n+7. In contrast, ACK/NACK (B) for the packet B is transmitted only at UL subframe #n+6 and is no longer repeatedly transmitted. That is, ACK/NACK (A) is fully repeated as scheduled and ACK/NACK (B) is transmitted only once. This operation means that the UE may analyze that ACK/NACK repetition is stopped when new DL transmission arrives. In this case, ACK/NACK (B) is not temporarily or conditionally repeated. The example of FIG. 23 may be equally applied to FIGS. 7 and 11.

Referring to FIG. 24, ACK/NACK (A) for the packet A is repeatedly transmitted four times at UL subframes #n+4, #n+5, #n+6 and #n+7. Similarly, ACK/NACK (B) for the packet B is repeatedly transmitted four times at UL subframes #n+6, #n+7, #n+8 and #n+9. That is, the repetition mode of ACK/NACK (B) is validly maintained and ACKs/NACKs overlap over two UL subframes. More specifically, semi-static ACK/NACK (A) and dynamic ACK/NACK (B) are simultaneously transmitted at subframe #n+6. Two semi-static ACKs/NACKs (A) and (B) are simultaneously transmitted at subframe #n+7. Accordingly, two semi-static ACK/NACK resources need to be reserved at subframe #n+7. Meanwhile, ACK/NACK repetition may be deactivated or disabled with respect to transmission subsequent to the packet B (or ACK/NACK (B)). FIG. 24 is similar to FIGS. 8 and 13 except that the repetition factor is 4.

Figure 25:
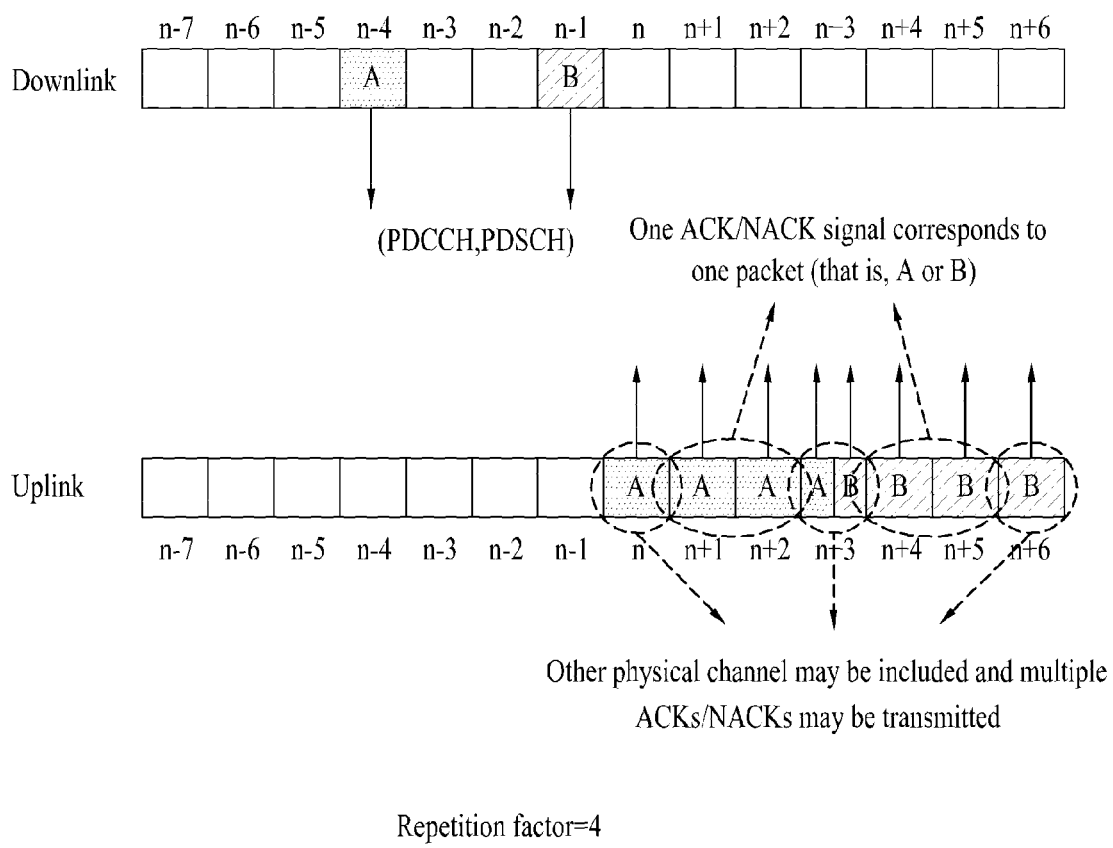

FIG. 25 shows reconfiguration of subframe indexes of FIG. 19. In FIG. 25, it is assumed that a packet A is transmitted at DL subframe #n−4 and a new packet B is transmitted at DL subframe #n−1 in the case in which a repetition factor is 4.

Referring to FIG. 25, in the case in which repeated ACK/NACK for the packet A is present but is not last repeated ACK/NACK (A) (e.g., ACK/NACK (A) at UL subframe #n+1 and #n+2), the UE does not transmit ACK/NACK (B) even when new packet transmission is performed (e.g., when the packet B is transmitted at DL subframes #n−3 and #n−2). In contrast, if the repeated ACK/NACK (A) for an old packet is the last (e.g., ACK/NACK (A) at UL subframe #n+3) and, at this time, ACK/NACK (B) for the packet B should be transmitted, the repeated ACK/NACK (A) for the packet A and the first ACK/NACK (B) for the packet (B) may be simultaneously transmitted.

Figure 26:
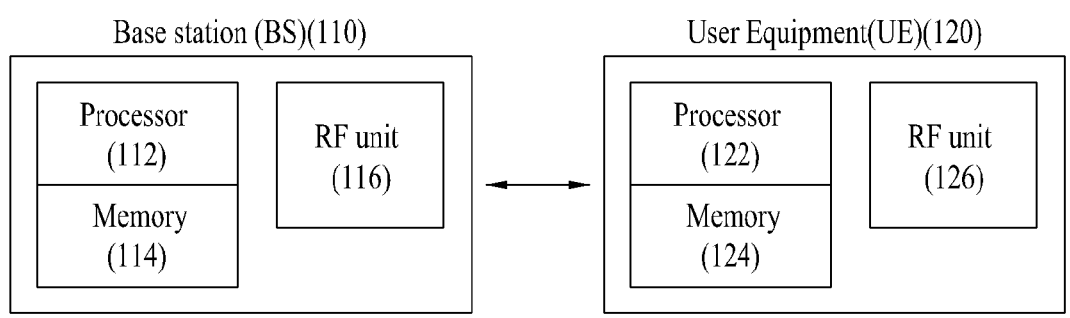
FIG. 26 is a block diagram showing a base station (BS) and a user equipment (UE) applicable to the present invention.

FIG. 26 is a block diagram showing a base station (BS) and a user equipment (UE) applicable to the embodiments of the present invention.

Referring to FIG. 26, a wireless communication system includes a base station (BS) 110 and a UE 120. In downlink a transmitter is a part of the BS 110 and a receiver is a part of the UE 120. In uplink, a transmitter is a part of the UE 120 and a receiver is a part of the BS 110. The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with operation of the processor 112. The RF unit 116 is connected to the processor 112 so as to transmit and/or receive an RF signal. The UE 120 includes a processor 122, a memory 124 and an RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive an RF signal. The BS 110 and/or the UE 120 may have a single antenna or multiple antennas. In addition, although not shown, the UE 120 may further include at least one of a power management module, a battery, a display, a keypad, an SIM card (optional), a speaker and a microphone.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a user equipment, a relay node and a base station. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term User Equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. Software code may be stored in a memory unit so as to be executed by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to wireless communication system and, more particularly, to a method and device for transmitting ACK/NACK in a wireless communication system.

The invention claimed is:

1. A method of transmitting acknowledgement (ACK)/negative ACK (NACK) at a user equipment (UE) in a state of an ACK/NACK repetition mode in a wireless communication system, the method comprising:
   receiving, by the UE, first data through a first downlink (DL) subframe;
   receiving, by the UE, second data through a second DL subframe;
   transmitting one or more repetitive ACK/NACK signals for the first data in one or more uplink (UL) subframes; and
   transmitting, by the UE, one or more repetitive ACK/NACK signals for the second data in one or more UL subframes,
   wherein, if an interval between the first DL subframe and the second DL subframe is less than a predetermined length, a number of repetitive transmission times of the one or more repetitive ACK/NACK signals for the second data is reduced, and
   wherein, if one of the one or more repetitive ACK/NACK signals for the first data and one of the one or more repetitive ACK/NACK signals for the second data are scheduled to be transmitted in a same UL subframe, transmission of a corresponding one of the one or more repetitive ACK/NACK signals for the first data is dropped at the UL subframe.

2. The method according to claim 1, wherein, if the number of repetitive transmission times of the one or more repetitive ACK/NACK signals for the second data is reduced, the reduction in the number of repetitive transmission times of the one or more repetitive ACK/NACK signals for the second data is temporarily applied to the transmission of the one or more repetitive ACK/NACK signals for the second data.

3. A wireless communication user equipment configured to transmit acknowledgement (ACK)/negative ACK (NACK) in a state of setting an ACK/NACK repetition mode, the wireless communication user equipment comprising:
   a radio frequency (RF) unit; and
   a processor configured to
      receive first data through a first downlink (DL) subframe,
      receive second data through a second DL subframe,
      transmit one or more repetitive ACK/NACK signals for the first data in one or more uplink (UL) subframes, and
      transmit one or more repetitive ACK/NACK signals for the second data in one or more UL subframes,
   wherein, if an interval between the first DL subframe and the second DL subframe is less than a predetermined length, a number of repetitive transmission times of the one or more repetitive ACK/NACK signals for the second data is reduced, and
   wherein, if one of the one or more repetitive ACK/NACK signals for the first data and one of the one or more repetitive ACK/NACK signals for the second data are scheduled to be transmitted in a same UL subframe, transmission of a corresponding one of the one or more repetitive ACK/NACK signals for the first data is dropped at the UL subframe.

4. The wireless communication user equipment according to claim 3, wherein, if the number of repetitive transmission times of the one or more repetitive ACK/NACK signals for the second data is reduced, the reduction in number of the number of repetitive transmission times of the one or more repetitive ACK/NACK signals for the second data is temporarily applied to the transmission of the one or more repetitive ACK/NACK signals for the second data.

* * * * *